(12) United States Patent
Ritter

(10) Patent No.: US 7,240,213 B1
(45) Date of Patent: Jul. 3, 2007

(54) SYSTEM TRUSTWORTHINESS TOOL AND METHODOLOGY

(75) Inventor: Jeffrey B. Ritter, Reston, VA (US)

(73) Assignee: Waters Edge Consulting, LLC., Reston, VA (US)

( * ) Notice: Subject to any disclaimer, the term of this patent is extended or adjusted under 35 U.S.C. 154(b) by 873 days.

(21) Appl. No.: 10/387,419

(22) Filed: Mar. 14, 2003

Related U.S. Application Data

(60) Provisional application No. 60/364,095, filed on Mar. 15, 2002.

(51) Int. Cl.
    *G06F 1/24* (2006.01)
(52) U.S. Cl. .................... 713/182; 380/23; 380/24; 380/25
(58) Field of Classification Search ............... 713/182; 380/25, 23, 24
    See application file for complete search history.

(56) References Cited

U.S. PATENT DOCUMENTS

| | | | |
|---|---|---|---|
| 5,311,591 A * | 5/1994 | Fischer | 713/156 |
| 5,586,254 A | 12/1996 | Kondo et al. | |
| 5,692,047 A * | 11/1997 | McManis | 713/167 |
| 5,745,574 A * | 4/1998 | Muftic | 713/157 |
| 5,778,172 A | 7/1998 | Riedle et al. | |
| 5,793,954 A | 8/1998 | Baker et al. | |
| 5,841,981 A | 11/1998 | Kondo | |
| 5,848,243 A | 12/1998 | Kulkarni et al. | |
| 5,966,509 A | 10/1999 | Abe et al. | |
| 6,020,889 A | 2/2000 | Tarbox et al. | |
| 6,029,192 A | 2/2000 | Hill et al. | |
| 6,122,639 A | 9/2000 | Babu et al. | |
| 6,289,380 B1 | 9/2001 | Battat et al. | |
| 6,415,321 B1 | 7/2002 | Gleichauf et al. | |
| 6,502,133 B1 | 12/2002 | Baulier et al. | |
| 2001/0018674 A1 | 8/2001 | Schein et al. | |
| 2002/0002684 A1 | 1/2002 | Fox et al. | |
| 2002/0016777 A1 | 2/2002 | Seamons et al. | |

(Continued)

FOREIGN PATENT DOCUMENTS

JP 406282218 10/1994

OTHER PUBLICATIONS

Jean-Claude Laprie, Dependability vs Survivability vs Trustworthiness http://www.laas.fr/IFIPWG/Workshops/42/01-Laprie.pdf.

(Continued)

*Primary Examiner*—Thomas R. Peeso
(74) *Attorney, Agent, or Firm*—Ditthavong Mori & Steiner, P.C.

(57) ABSTRACT

A tool and methodology are described that can evaluate the trustworthiness of a system. In one embodiment, the system is classified in terms of the resources that constitute the system, the codes that apply to the system, the services produced by the system, the risks incurred by the system, and the costs associated with its use. A functional component of a trust decision to use the system involves a calculus to evaluate whether the probability that the services as a result of using the system will exceed the risks that may occur as valued by a user. The cost component of a trust decision includes an evaluation that the use of a system will occur at an acceptable cost and will produce economically acceptable results.

35 Claims, 6 Drawing Sheets

U.S. PATENT DOCUMENTS

| | | |
|---|---|---|
| 2002/0016790 A1 | 2/2002 | Arnold et al. |
| 2002/0018674 A1 | 2/2002 | Miyamura |
| 2002/0026576 A1 | 2/2002 | Das-Purkayastha et al. |
| 2002/0026579 A1 | 2/2002 | Wiederin et al. |
| 2002/0091809 A1 | 7/2002 | Menzies et al. |
| 2002/0138608 A1 | 9/2002 | Canis et al. |
| 2002/0152304 A1 | 10/2002 | Collazo |
| 2002/0152305 A1 | 10/2002 | Jackson et al. |
| 2002/0156865 A1 | 10/2002 | Rajarajan et al. |
| 2002/0156884 A1 | 10/2002 | Bertram et al. |
| 2002/0161873 A1 | 10/2002 | McGuire |
| 2002/0163934 A1 | 11/2002 | Moore et al. |
| 2002/0184334 A1 | 12/2002 | Cherry et al. |
| 2002/0198984 A1 | 12/2002 | Goldstein et al. |
| 2003/0014507 A1 | 1/2003 | Bertram et al. |
| 2003/0014518 A1 | 1/2003 | Richard |

OTHER PUBLICATIONS

Trustworthy Information Systems Handbook http://www..mnhs.org/preserve/records/tis/tableofcontents.html.

Robert Thibadeau, Report on the Workshop on Trust Infrastructures, Technical Report, Nov. 27, 2001, 9 pages, The eCommerce Institute School of Computer Science Carnegie Melton University.

Rena Mears et al, A Matter Of Trust, online article, Mar. 2003, 5 pages, Issue 17, CMP Media LLC.

W.M. Pryke et al, Systems Integration throughout the early lfe cycle, Jul. 1997, 10 pages, BT Technol J vol. 15 No. 3.

James W. Garson, Modal Logic, Online Stanford Encyclopedia of Philosophy, Dec. 13, 2001, 17 pages.

David L. Stone, Technological Risk Assessment at Zions Bancorporation, Risk Management online magazine article, Oct. 1, 2002, 11 pages, vol. 49 Issue 10, Risk Management Society Publishing, Inc.

George A. Chidi Jr., Forging Circles of Trust, InfoWorld online article, Apr. 19, 2002, 2 pages.

Cally Jordan et al, Financial Regulatory Harmonization and the Globalization of Finance, World Bank Policy Research Working Paper, Oct. 2002, 27 pages, Working paper 2919.

Anand S. Rao et al, Formal Models and Decision Procedures for Multi-Agent Systems, Technical Note 61, Jun. 1995, 54 pages.

* cited by examiner

CODES TABLE 400

| 401: KEY | 403: CATEGORY | 405: JURISDICTION | 407: DESCRIPTOR | 409: BEHAVIOR |
|---|---|---|---|---|
| 411 | 1232201 | 1.1.24.0.0 | 232201.1.1.1.1.1.3 | BROKER SIG |
| 413 | 1432201 | 1.1.24.38.0 | 232201.1.1.1.1.1.227 | AUTHORITY |
| 415 | 3332201 | 1.1.99.0.0 | 232201.1.1.1.1.1.2.001 | UNDER $200 |
| 417 | 3332201 | 1.1.99.0.0 | 232201.1.1.1.1.1.2.002 | UNDER $500 |
| 419 | 1413010 | 1.1.24.0.0 | 110700.72.2.1.203 | EMAIL EVID. |
| ... | ... | ... | ... | ... |

RELATED CODES 420

| 421: CODE1 | 423: CODE2 |
|---|---|
| 411 | 419 |
| ... | ... |

RELATED SERVICES 430

| 431: CODE | 433: SERVICE |
|---|---|
| 417 | 445 |
| ... | ... |

RELATED RESOURCES 440

| 441: CODE | 443: RESOURCE |
|---|---|
| 417 | 455 |
| ... | ... |

RELATED RISKS 450

| 451: CODE | 453: RISK |
|---|---|
| 417 | 465 |
| ... | ... |

EVALUATION TABLE 460

| 461: KEY | 463: WEIGHT | 465: FREQUENCY | 467: RATING | 469: PROB |
|---|---|---|---|---|
| ... | ... | ... | ... | ... |

FIG. 4

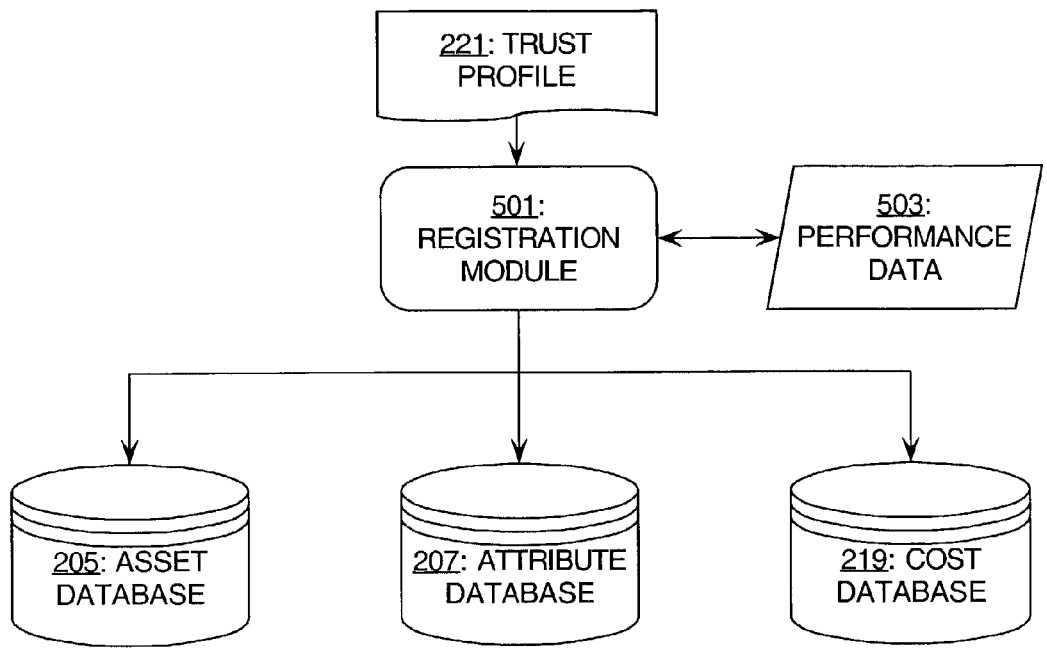
FIG. 5
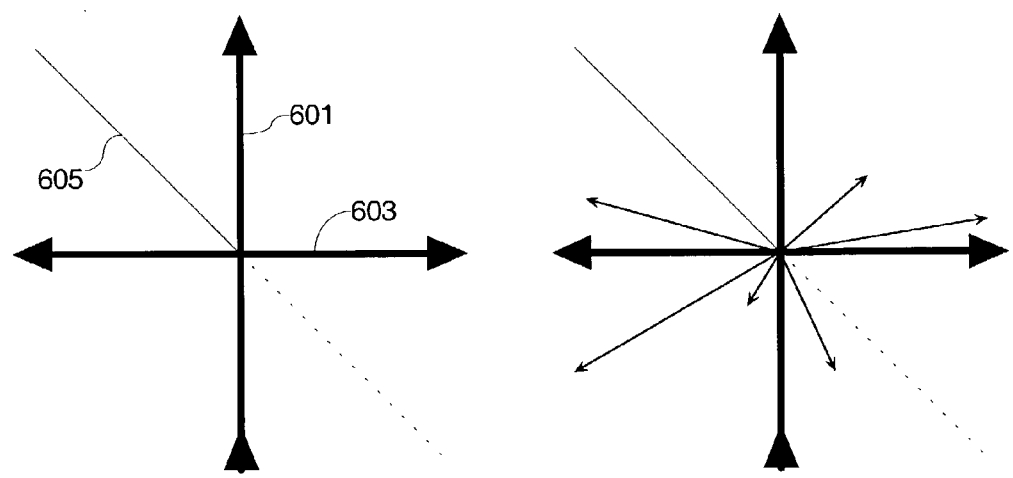
FIG. 6  FIG. 7

SYSTEM TRUSTWORTHINESS TOOL AND METHODOLOGY

RELATED APPLICATIONS

The present application claims the benefit of U.S. Provisional Patent Application Ser. No. 60/364,095 filed on Mar. 15, 2002, the contents of which are hereby incorporated by reference.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to systems engineering and more particularly to systems, software, tools, and methods for designing, analyzing, and selecting systems and negotiating the acquisition and use of systems.

BACKGROUND OF THE INVENTION

Ever since a person first threw a stick to knock fruit from a tree, the ability to select and use tools has been a defining human characteristic. Experience and intelligence have also enabled tools to be fashioned to perform more complex work and to work in combination with other tools. The increased complexity and sophistication of modern tools has also increased the complexity of the systems constructed from those tools. This complexity is challenging many aspects of contemporary life, including the continued advancement of methods for designing, analyzing and selecting systems to perform complex services.

As used herein, a "system," regardless of its complexity, includes any group of interacting, interrelated, or interdependent elements to perform a particular task of work. Systems can be mechanical, chemical, biological, electronic, or financial in nature and involve any combination of technology or economics to produce a desired outcome. As an example, an information system can include computers, software, power networks, storage media, user manuals and associated input and output devices that collect, process, and present data and information. A system is both a singular tool, as well as a combination of tools and other resources that are assembled, operated and relied upon concurrently in order to perform a specific assigned task of work.

Any decision to select and use a system involves a necessary determination that the system can be trusted to perform the work for which the system is being selected. Trust decisions evaluate the suitability of the system as well as the likelihood the system will perform as anticipated. Trusting a system is a crucial variable in the ability to assemble and operate more complex systems, particularly information systems and communication systems. In the absence of confidence that a more complex system will operate as intended, without incurring unacceptable risks or costs, a system will not be trusted. The inability of a system to be trustworthy prevents an affirmative decision to select and use a system and dooms the practical success of the system itself.

Historically, trust has been considered as a qualitative or emotional value not readily capable of quantitative analysis or management. Those engaged in system design, evaluation and selection have lacked the tools and resources with which to assess a system's trustworthiness. The absence of suitable tools and resources has also made it difficult to design systems to take account of, and adapt to, the risks and costs associated with the use of that system. As a result, many systems are developed with a substantial degree of trial and error, with limited quantitative evaluations of how the design and function of the system induce trustworthiness.

For information systems, much of the attention given to trust focuses on issues relating to the security and integrity of the information processes performed by those systems. This approach, largely embodied in risk management methods, focuses on mitigating risks with technology and process controls that may be available but fails to incorporate into the design and evaluation processes the many factors that influence how humans decide to trust a system, including any system made up of multiple components or systems. Current processes also lack a means of incorporating into a system's design or selection critical variables that influence the trust decision. These additional variables reflect (a) the frameworks of business and legal rules that apply to the work to be performed, such as transactions in an information system, (b) the costs associated with a system's use and operation, and (c) information and performance data regarding the historical and current operations of a system (or its components) in performing the work for which they have been selected.

The absence of a predictive tool associated with evaluating trust and capable of use in the design, construction, operation, selection and use of systems permits significant inefficiencies to persist in the use of existing systems and the innovation of more complex systems. These inefficiencies transform themselves into concerns regarding the trustworthiness of systems. For example, nearly 45% of American businesses report that their lack of trust in online transaction systems prevent them from making greater use of those systems. Similar concerns characterize consumer and government confidence in many different kinds of information and mechanical systems, including those used to operate aircraft, support medical care, conduct online purchases, access electronic libraries or educate children. To date, no tool or method exists by which trustworthiness can be integrated into the design, selection and use of systems and their components or their ongoing operation.

SUMMARY OF THE INVENTION

The present invention addresses the need for a tool and method that can evaluate the trustworthiness of modern systems. As used herein, evaluating a system includes analyzing, designing, selecting, negotiating, comparing, and otherwise evaluating the system. In accordance with the present invention, trust decisions are quantified to take account of both a functional component and a cost component. The functional component of a trust decision involves a calculus to evaluate whether the probability that the results to be achieved by a system valued by a user will exceed the risks that may occur as a result of using the system. The cost component of a trust decision includes an evaluation that the use of a system will occur at an acceptable cost and will produce economically acceptable results.

One aspect of the present invention stems from the realization that the technological components of a system are insufficient to fully characterize the trustworthiness of that system. The usefulness of a system often relies upon assets that are external to a system itself. These assets include codes or rules that regulate the conduct of those using or operating the system. In addition, systems, if they are not used properly, may produce losses or other less-than-expected results. Therefore, this aspect of the present invention incorporates into the calculus of trust the existence and effect of codes and rules that influence how a system is used and how the risks associated with the use of a system are allocated under those codes and rules. Accordingly, some embodiments in accordance with this aspect of the present invention utilize descriptions of (a) the services to be performed by the components of a system and related resources, and (b) the risks associated with their use (both separately and in combination with one another), together with (c) descriptions of the rules relating to a system's use, to produce a "trust profile" of the system. Furthermore, actuarial information (frequency of use, probability of occurrence, and rating) obtained, for example, by real-time collection of system performance data, can be accounted for in evaluating the trustworthiness of a system, both in its design and operation.

Another aspect of the present invention is directed to quantifying the trustworthiness of systems based on their trust profiles. In this aspect, a user assigns and inputs weights to each of the services and risks accounted for in a system's trust profile, indicating the importance of each of the services and risks, as well as those to which the user is indifferent. A system's overall elements are evaluated, and if the weighted elements meet or exceed a user's requirements, a system passes the functional component of trust. Two different systems, each with different trust profiles, can be compared by applying the same weights to the different trust profiles and balancing the relative trustworthiness of the two systems.

Similarly, the present invention permits the assets relied upon to construct or use a system, and the related rules, to be evaluated and weighted. The costs associated with the assets can be assigned and evaluated, both in terms of any expenditures to acquire or operate a system (or its components) and the value produced through its operations. If the system's proposed costs of operation are within established limits, and the system produces value that is equal to or above established minimum requirements, the system passes the cost component of trust. Two different systems, each with different components and costs, can be compared to evaluate the relative trustworthiness of the two systems.

Still another aspect of the invention involves a structured taxonomy from which the various elements of a system (including all related services, risks, resources, codes, positive costs and negative costs; collectively herein referred to as "elements") may be labeled and associations and dependent relationships among them described and identified in a manner that permits the analytical and computational functions of the invention to be utilized. Controls may be scripted to require that the use or presence of various elements requires consideration of the dependent relationships, together with analytical determinations regarding the management of the related elements by the system being considered. The taxonomy includes a referential capability that permits mathematical evaluation and visual presentation of the information developed through the use of the invention in order to facilitate human and automated trust decisions regarding a system, thereby providing information supplemental to existing descriptive systems in order to facilitate other existing means for assembling more complex systems or, with respect to information systems, exchanging information between or among different systems or their components.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and descriptions are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 illustrates a database schema that can be used by an embodiment of the present invention.

FIG. 5 depicts a registration system in accordance with one embodiment of the present invention.

FIG. 6 shows visual output produced by an embodiment of the present invention.

FIG. 7 depicts a visualized trust profile in accordance with an embodiment of the present invention.

DESCRIPTION OF THE PREFERRED EMBODIMENT

Figure 1:
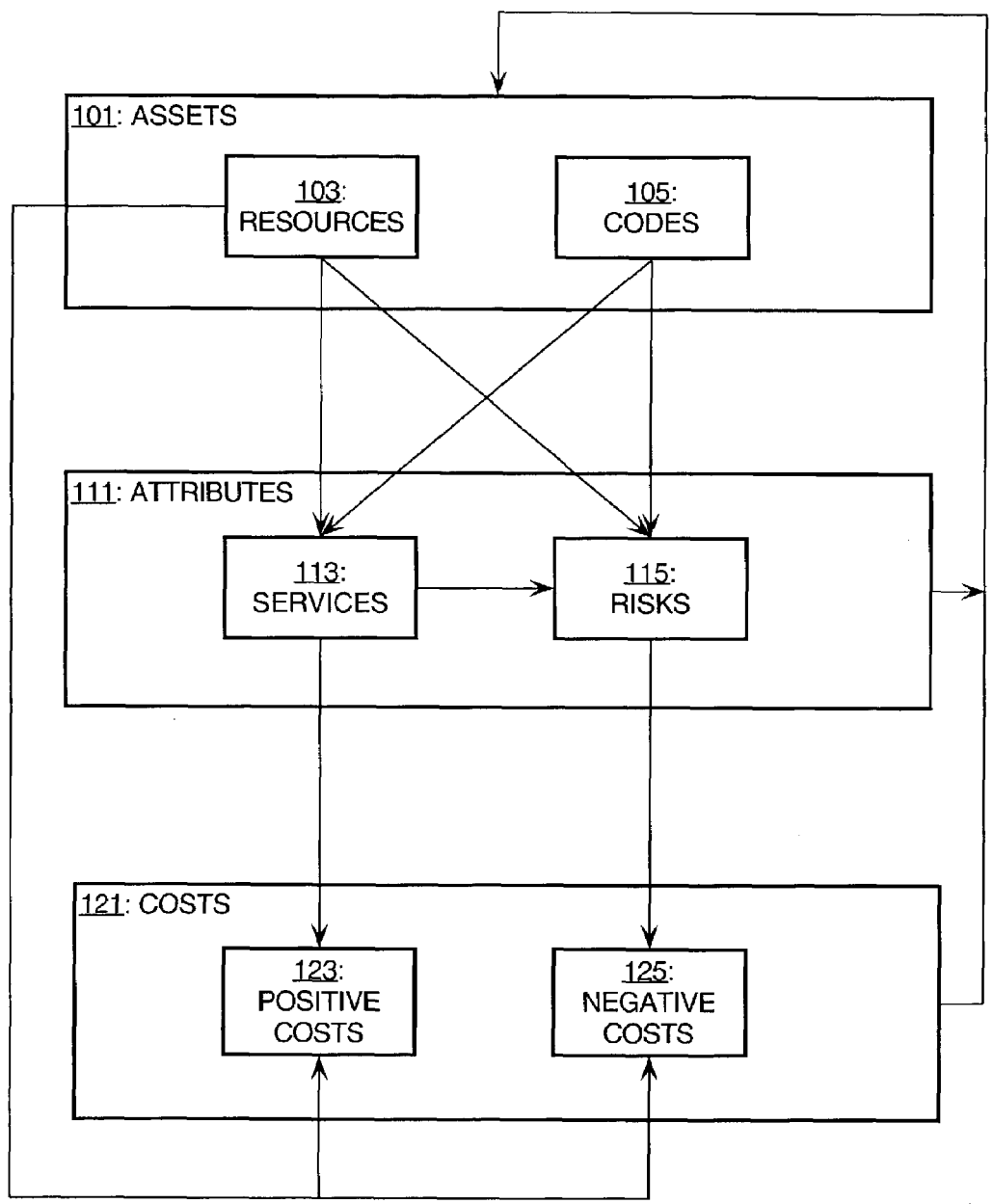
FIG. 1 is an diagram showing a conceptual relationship of system elements relevant to trust decisions in accordance with one embodiment of the present invention.

A system, software and method for analysis and evaluation of the trustworthiness of a designed system are described, in which a trust profile for a system can be developed, analyzed and subjected to measurement services. Although applicable to any designated system, an embodiment of the present invention is especially useful in evaluating information systems that may be operated across networked computing and communication facilities or which may exchange information or files with out information system by such means.

In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Conceptual Overview

The present invention responds to a long-felt need for tools and methods capable of evaluating the trustworthiness of systems by providing a conceptual framework for analyzing systems such that the trustworthiness of a system can be measured or quantified in a numerical manner, and users of systems are provided improved means for determining that systems can be trusted favorably. One embodiment of the present invention also provides a means for evaluating the effect of modifications to systems or the trustworthiness of those systems. This conceptual framework is based on the following principles.

Systems, including information systems, are tools. Like any tools, they perform work, producing goods and services that are of value to the user. When a person elects to use a system (such as an information system), that person makes a voluntary decision to use that system as a tool. This decision is no different than any other decision to employ, or not employ, a particular tool. The affirmative selection of a tool involves a decision of trust—the user must determine that a tool can be trusted to be suitable for performing the work for which the tool is to be used. Tools can be used successfully for performing work that is very different than the work for which they are intended (such as using a shoe's heel to hammer a nail); however, that decision is inherently an evaluative, analytical decision that involves an affirmative judgment of the trustworthiness of the tool.

Measuring the trustworthiness of any tool involves a functional component in which the value and likelihood of the intended results is measured against the possible or actual risks associated with the tool's use. For any tool to be considered trustworthy, including systems, the expected services to be provided by use of the tool must outweigh the foreseeability and impact of any related risks. The use of a tool also involves an economic calculation of the overall costs, taking into account both the expenses associated with acquiring and using the tool and the gains realized from that use.

Accordingly, to measure the trustworthiness of a system, one embodiment of the present invention allows a system to be characterized both in terms of the services provided by the system and the risks related to the use of the system. Virtually every service that a system may perform is associated with an opposite risk—the consequences of that service not being performed. In addition, other risks may be associated with a particular system. The services and risks of a system are collectively referred to herein as the "attributes" of the system.

A tool's functionality must also make economic sense; it must be capable of being realized within cost boundaries that are acceptable. Consequently, another dimension upon which a system is evaluated in one embodiment of the present invention pertains to the costs of the system, both positive costs (i.e., the value of the results produced) and negative costs (i.e., expenses incurred, including those associated with the occurrence of related risks). The positive costs and negative costs of a system are collectively referred to herein as the "costs" of the system.

Another principle is that systems, as tools, are not self-contained but operate within a given situational context. In fact, assessing the trustworthiness of a system, particularly those used in social or commercial settings, requires a user to evaluate and rely upon the existence, and effectiveness, of codes and rules governing the behavior of others with whom certain risks may be associated. Many of these rules are outside the system but their existence is nevertheless essential to decisions to trust the system. For example, a stoplight is a system, the trustworthiness of which is dependent upon the traffic rules that make it illegal to drive against the red light.

Experience with information systems, particularly since the commercialization of the Internet, confirms that many systems have completely or partially failed to earn the trust of potential users, through either (a) the absence of adequate rules governing behaviors associated with a system or (b) the actual or perceived ineffectiveness of those rules in preventing certain behaviors associated with the related risks. Services that are intended to provide computer security, to protect copyrighted materials, or to manage the privacy of personal information, for example, have become particularly vulnerable to the difficulty of integrating existing legal rules with the functions of the related technologies.

Therefore, in evaluating the trustworthiness of a system, one embodiment of the present invention allows the assets of a system to be analyzed, not just in terms of applied technology and other resources (collectively referred to herein as the "resources" for a system), but also in terms of the codes and rules that govern the legal and risk-bearing behavior of that system and related participants (collectively referred herein as the "codes" for a system; the resources and costs of a system are collectively referred to herein as the "assets" of a system). This procedure is conducted with an accounting of the services that are to be performed, as well as of other internal and external risks and costs that may influence an evaluation of the trustworthiness of a system in particular circumstances.

FIG. 1 shows an entity-relationship diagram of the elements of a system in accordance with one embodiment of the invention in terms of the system's assets 101, attributes 111, and costs 121. This classification of elements provides the foundation for developing a trust profile for the system and performing the computational, design and evaluation functions that are possible for the system. A trust profile is a representation of the system that can be evaluated to determine the trustworthiness of the system. These elements are explained in further detail as follows. For illustrative purposes, examples are provided with respect to an exemplary information system that would be used to execute financial transactions across the Internet through an application service provider. However, it is important to emphasize the broad utility of the invention is not limited to information systems.

Assets

The assets 101 of a system include both resources 103 and codes 105. Resources 101 include the mechanical, chemical, physical, financial, and various ancillary means from which the system is physically constructed or which are otherwise relevant to the system's operations. A system can be simple or complex, closed or open, permanent or ad hoc in nature, but the components that make up the resources, and the architecture and structure of those resources, are capable of being identified with substantial accuracy. The system's components are often supplemented by certain external resources, such as physical facilities, power supplies, service providers and insurance coverage (e.g., a contract is a resource). External features, such as the jurisdiction in which a system will be operated, may be considered relevant to developing the trust profile of a system and are also included as resources 101.

The exemplary financial information system would include, but not be limited to, the following as resources 101: the physical facilities in which the computer servers operating the system are installed; the servers on which the related software is installed; each of the software applications operated to provide the transactions, including, by example, web interfaces, applications, operating systems and executable scripts; databases relied upon to input information required for the transaction; the employees providing hosting, programming and administrative support; the power supply to the facilities and the insurance policies that insure the physical facilities.

Codes 105 include the rules and instructions which govern the behavior or conduct of those using the system or which relate to the services which a system may perform. A system incorporates many codes that are integrated into or embedded within a system or its components—those rules are considered intrinsic to the particular resources (such as software applications). However, many codes associated with a system are not integrated into or embedded within a system's components but are important to evaluating the functionality component of the trustworthiness of that system. For example, many rules governing the operation or use of a system are stated outside the system in various sources—in laws, regulations, industry standards, corporate policies, system operation manuals, contracts or agreements or other sources. The existence of codes, and their effectiveness in governing the behavior of a system's users or in defining the suitability of the services to be performed by a system, can directly impact the trustworthiness of a system.

For example, the codes 105 for the exemplary financial information system may include, by way of illustration: the federal laws governing electronic funds transfers; the Internal Revenue Code requirements for retaining original business records of transactions; federal regulations governing consumer banking transactions; articles 3,4 and 4A of the Uniform Commercial Code (UCC); operating procedures and agreements for automated clearing houses (organizations of banks and other service providers) through which the transactions are electronically processed; and processing, communication and customer service agreements among the provider of the services, its suppliers and vendors and its customers.

Systems are assembled through the selection and use of specified resources 103 and the adoption and/or implementation of specific codes 105 associated with the system. When integrated, the resources 103 and codes 105 can operate on an interdependent basis. By assembling specific resources 103 and adopting or complying with specific codes 105, a system is intended to produce specified services 113, and avoid the occurrence of any risks 115 that interfere with the expectations for use of the system. Specifically, each resource 103 of the system and each code 105 applicable to the system facilitates the performance of specific services 113 and presents the possibility of the occurrence of certain risks 115.

Attributes

The attributes 111 of a system comprise the services 113 performed by the system and the risks 115 associated with the system. Services 113 include the work to be performed through the use of the system in specified circumstances, including the processing or behavioral activities that occur through the use of the system. Services 113 are generally expected to occur as the expected output of the use of a system. Services 113 can be stated in many different ways, but, generally, only measurable, quantifiable outcomes are considered; emotional satisfaction or good will (though often an expected and intended result) need not be taken into account. For information systems, by example, services 113 may include, among other things, accurate processing computations, the production of certain records meeting defined legal or business requirements, the proper execution of certain communications, the performance of certain transactions, the authorization of certain actions, and the termination or avoidance of certain conduct or events. Services 113 can include actions or consequences occurring external to the system that have a causal relationship to the system's operation.

For example, the services 113 of processing a single transaction through the exemplary financial information system may include: permitting access to an authorized user who properly presents a previously approved userid/password; a record of the payment that meets defined criteria; correct addition of the charges, taxes and incidental costs to compute the total amount of the payment; transfer of funds to the intended payee; executing the transaction within 0.5 seconds; and an electronic message to the delivery company to deliver the related goods for which payment has been made.

Risks 115 include the events or circumstances that may occur in connection with the use of a system that are adverse to the interests of those offering or using a system. Risks, among other things, can be stated as the opposite of any services 113 identified as attributes 111 of the system. Accordingly, every service 113 creates a risk 115 dependency that indicate the failure of the service 113 to produce its result. Moreover, risks 115 may also include consequences that result from the improper operation or use of the system or multiple adverse failures of the services 113. Risks 115 can also include events or circumstances occurring external to the system but which have a causal relationship to the system's use.

In the example, some of the risks 115 for processing a single transactions through the exemplary information system may include: access improperly denied to an authorized user; improper calculation of total payment amount; inadequate records to meet documentation requirements of Internal Revenue Code; delayed execution, resulting in interest charges or the dishonor of the payment transaction; no notice to delivery company to deliver the goods; and a roof collapse at the hosting provider physical site. Not all of these risks 115 can be mitigated or managed by the system's design or operation; however, trust decisions try to take account of all risks 115 to which a user is not indifferent.

A system is characterized by a tension between the specific services 113 that are intended to be produced through its use and the risks 115 associated with the operation and use of the system. As the services 113 a system is to produce become more complex or more highly valued, then the risks 115 associated with that system increase in their complexity or weight. One aspect of the invention is based upon the following principle: a system will not be used if the risks 115 associated with its use outweigh the services 113 that can be obtained. This can be articulated in actuarial terms that the invention calculates: if the probability of certain risks 115 occurring, and the adverse value of those events (whether measured in frequency or magnitude), exceeds the value of the services 113 that can be obtained (whether measured in frequency or magnitude), the system is not considered trustworthy and should not be employed. Conversely, if the system's expected services 113 exceed the value of the possible risks 115, the system may be considered reliable for use, i.e. trustworthy. This is the essential principle by which the functional component of a trust decision is determined.

If the system is determined not to be trustworthy because the risks 115 of the system outweighs the services 113 to be performed, then the system designer can deploy additional assets 101 (e.g., resources 103 and/or codes 105) to produce additional services 113 that mitigate the value of those risks and thereby transform the functional trustworthiness of the system. The present invention includes the capacity for an operator and a user of a system to negotiate the functional component, as part of the trust profile of a system, in order to produce a system that is mutually acceptable.

Costs

In economic terms, a system reflects two classes of costs 121: positive costs 123 and negative costs 125. Regardless of the functional trustworthiness of a system, the system will not be considered trustworthy if the net costs associated with a system are not acceptable. The costs 121 of a system may be calculated differently based upon whether an embodiment of the invention is being used on behalf of an operator (being an entity responsible for the operation of the system), a user (being an entity using the system for its intended purposes) or a sponsor (being an entity that authorizes, licenses or endorses the existence or operation of a system).

Positive costs 123 include those costs, measured in economic terms, that positively result from the use of the system. These positive costs can be associated with income realized by obtaining the intended services 113 or through reduced expenses associated with not employing alternative means of performing the same work performed through the use of the system. Many positive costs 123 can be directly calculated from the resources 103 and services 113 through the use of generally accepted accounting principles. Since some positive costs 123 occur outside the system, those positive costs 123 (to the extent they can be causally related) can be taken into account by specifying a service 113 associated with the system.

In the example of the financial information system, positive costs 123 are stated differently for different stakeholders. For example, for a customer, the positive costs 123 of the exemplary information system include: cost savings (and the cost value of time saved) realized through the use of electronic, versus mail-based, payments; the elimination of storage costs associated with invoices, paper checks, bank statements and similar media associated with mail-based payments and conventional banking. For the operator of the exemplary information system, positive costs 123 include: income realized as service charges for the use of the system; cost savings realized from the elimination of processing mailed and manual paper-based payments paper storage (and electronic conversion of records); and cost savings from the reduction of staff personnel required to provide direct support to processing paper-based payments.

Negative costs 125, on the other hand, include those costs, measured in economic terms, that are incurred in the use of the system or the existence, or occurrence of risks 115, that are associated with a system. The negative costs 125 associated with risks 115 relate both to the costs incurred if the risks result in actual adverse events occurring, as well as the costs that may be associated with certain conduct not occurring as a result of the presence or likelihood of particular risks. Although many negative costs 125 can be directly calculated from the price of the resources 103 (including those required to protect against the related risks) through the use of generally accepted accounting principles, some negative costs 125 (such as those associated with certain risks 115) must be estimated by actuarial means. Since some negative costs 125 occur outside a system, those negative costs 125 (to the extent they can be causally related) can be taken into account by specifying a risk 115 associated with the system.

In the exemplary financial information system, the negative costs 125 may be stated differently for different stakeholders. For example, for the customer of the exemplary information system, the negative costs 125 include: service fees payable for using the payment service; cost of time expended in performing the payment activity; the costs of acquiring the computer and related equipment to access the payment service and the costs associated with retaining paper-based payment methods for larger payments for which the customer is uncomfortable executing through the use of the system. For the operator, the negative costs 125 include: fees payable to acquire the computer equipment, software and services required to establish and operate the service; insurance premiums payable for insurance coverage related to the use of the system and lost savings due to the need to maintain the paper-based payment methods for non-electronic transactions.

A system is characterized by a tension between the positive costs 123 and the negative costs 125 that are associated with the operation and use of the system. There is a further tension between the resources 103 with which a system is assembled and operated and the codes 105 that are related to its operation, particularly those related to regulating or governing particular conduct by a user or operator of a system. This tension arises from the fact that the costs 121 for particular resources relied upon to produce a specific set of services 113 to regulate behavior may be different than the costs 121 associated with reliance upon certain codes to control behavior. Indeed, with many systems, their use produces significant advantages by regulating and assuring certain behaviors more effectively, and at lower cost, than alternatives that are represented by codes 105.

In the exemplary system, an important service is to assure that any user accessing a specific account is the actual, authorized user. One solution is to employ userid/password combinations as a resource 103 while imposing a code 105 that any user will not disclose or provide the userid/password to any other person. There are certain risks 115 associated with that system design that present certain negative costs 125. A different solution is to require each user to present a physical smart-card into a slot in a computer device that is part of the system. In that manner, only one unique user can access the system. But that system presents different risks 115 and different negative costs 125. The invention facilitates an identification and quantification of the costs 121 in order to produce a cost component of the trust decision.

One aspect of the invention is based on the following principle: a system is not trustworthy if the negative costs 125 exceed the positive costs 123. Positive costs 123 and negative costs 125, in some uses of the invention, can be netted together in order to determine a net cost 121 associated with a particular use of a system. The cost component of a trust decision has two components: the use of the system must not produce negative costs 125 that exceed a specified maximum amount (as determined by the user, operator or sponsor, as appropriate) and the positive costs 123, when netted against the negative costs 125, must exceed a specified minimum amount. Since certain costs can be incurred outside of the functional use of the system, it is possible for the direct costs related to a system's use to be different than the overall costs taken into account in determining whether a system is trustworthy. These calculations produce the cost component of a trust decision.

If the system is determined not to be trustworthy because the costs 121 do not meet applicable requirements, then the system designer can change the assets 101 (e.g., resources 103 and/or codes 105) to produce equivalent services 113 but at costs that meet the applicable requirements, either through less negative costs 125 or additional positive costs 123. Accordingly, some embodiments of the present invention can support the capacity of an operator and a user to negotiate the cost components of a system, as part of a trust profile of that system, in order to produce a system that is mutually acceptable.

System Overview

Figure 2:
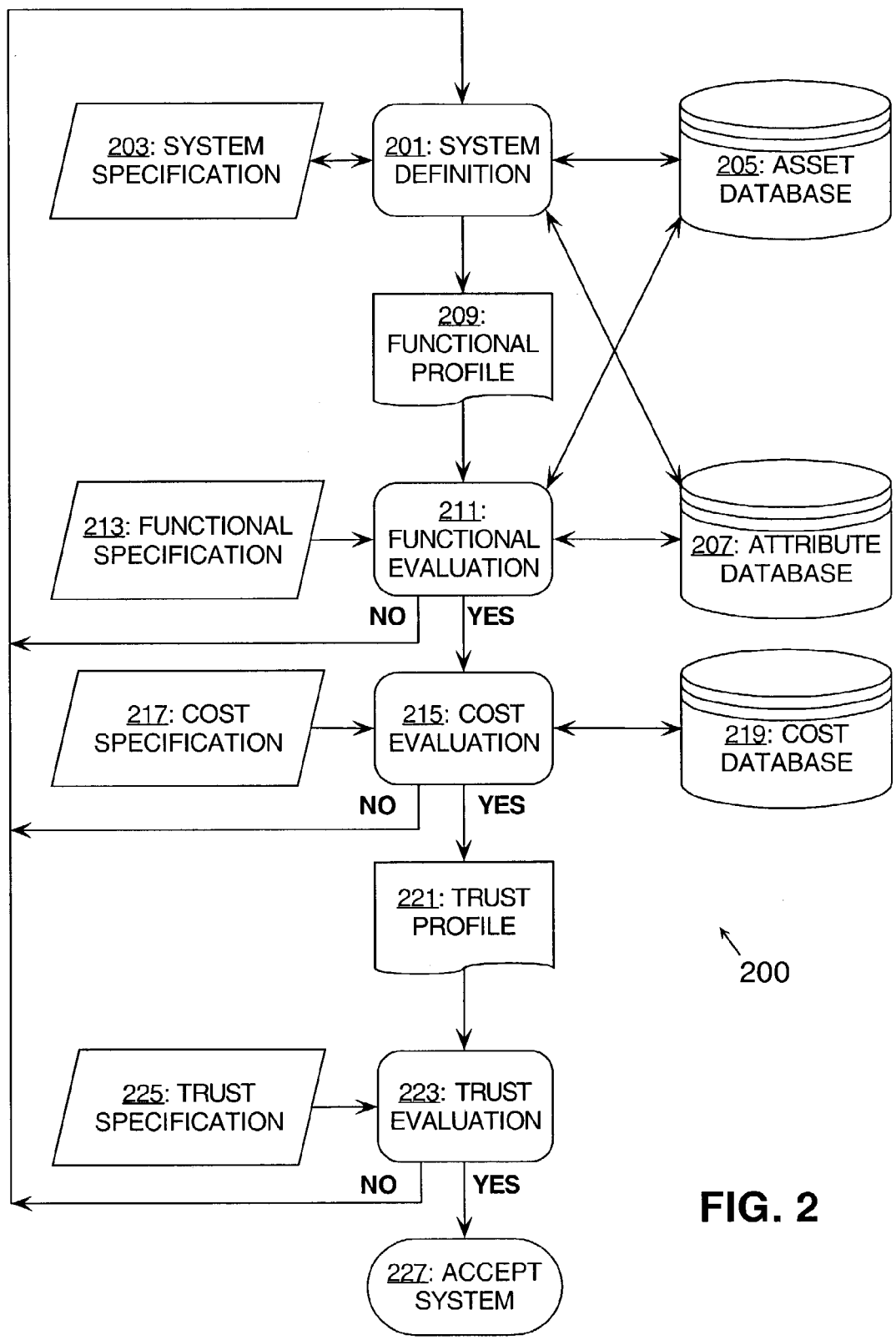
FIG. 2 illustrates an implementation of a system 200 for analyzing and evaluating the trustworthiness of a system in accordance with one embodiment of the present invention.

FIG. 2 illustrates one implementation of a system 200 for analyzing and evaluating the trustworthiness of a system in accordance with one embodiment of the present invention. The system 200 can be implemented in software upon one or more computer processors, relational database management systems, and graphical user interfaces, but the present invention is not limited to this particular configuration. Each module as described herein can be a self-contained software program or a routine integrated into a larger computer program. Furthermore, the modules can be implemented on separate computer systems, interacting using network communications, or on the same computer system, interacting with each other via inter-process communication or intra-process communication techniques depending on the particular software architecture employed.

In the embodiment illustrated in FIG. 2, a user wishes to employ the system 200 to evaluate the trustworthiness of a designated system to perform certain work. The user may interact with a system definition module 201, which is responsible for presenting a user with an interface to receive, as input from the user, an initial system specification 203 that describes the known or desired assets 101 and attributes 111 of the designated system for which the specification 203 is provided. The user may also employ the system definition module 201 to specify those assets 101 and attributes 111 that are capable of being identified by the user from the asset database 205 and the attribute database 207 accessible to the system definition module 201. The system definition module 201 can then query the user to augment the user's specification 203 of the designated system with applicable codes 105 within the asset database 205 and the attribute database 207 that must be satisfied by the performance of the designated system or the related conduct of the user. In addition, the system definition module 201 can query, in response to user commands, the asset database 205 and the attribute database 207 to look up additional resources 103, codes 105, services 113, and risks 115, based on the user's system specification 203, that are associated with the designated system.

The system definition module 201 permits the initial content of a system specification 203 for the designated system to be composed in a variety of manners. For example, the designated system 203 can be incrementally developed, modified, and entered by the user by repeatedly interacting with the system definition module 201 to develop an increasingly complete description of the designated system until the description reaches a point of indifference.

One output of the system definition module 201 is a functional profile 209 that lists the assets 101 of the designated system (i.e., a listing of the resources 103 and the codes 105 required for the operation of the system) and the attributes 111 of the designated system (e.g. a listing of the services 113 provided by the user's system and the risks 115 incurred in the use of the system).

A user may also establish a functional specification 213 that establishes certain requirements that the designated system must meet, based on the values that may be established by the user. The functional profile 209 can be input into a functional evaluation module 211, which evaluates the elements of the functional profile (including one or more of the resources 103, codes 105, services 113, and risks 115) in actuarial terms based on user defined values set forth in the functional specification 213. The functional evaluation module 211 can be used to determine whether the overall functional profile 209 meets the functional specification 213 requirements. If the result of the functional evaluation 211 indicates that the functional profile 209 meets or exceeds requirements represented by the functional specification 213, then the user may proceed to cost evaluation 215 to determine if the designated system produces a suitable cost component. On the other hand, if the functional profile 209 does not meet the requirements represented by the functional specification 213, then the designated system is not considered trustworthy, and the user may reject the designated system or seek to modify the designated system by returning to the system definition module 201.

Another component is provided by a cost evaluation module 215, which examines the functional profile 209 and queries a cost database 219 in order to output an estimation of the economic costs associated with the operation of the designated system. In one implementation, the user may input a cost specification 217 into the cost evaluation module 215 which serves to specify maximum negative costs 125 or minimum positive costs 123 to be experienced in connection with any possible use of the designated system or the performance of specific services. Additional cost information, such as current prevailing industry or manufacturer prices, can be obtained from the cost database 219 if not already specified by the user. The cost evaluation module 215 can compare the cost specification 217 against the output of the estimated economic costs in order to determine if such costs meet requirements set forth in the cost specification 217.

The cost evaluation module 215 may evaluate the costs of the functional profile 209 directly or indirectly; in the latter case, the cost evaluation module 215, with access to the cost database 219, forecasts the costs by evaluating the economic value of the services 113 provided, as well as, among other factors, the probability and costs associated with the risks 115 within the functional profile 209. Furthermore, actuarial services can also be employed for conducting indirect cost determinations.

The result of the functional evaluation 211 and the cost evaluation 215 is a trust profile 221, and the trust profile 221 references the functional profile 209, the function specification 213, and the cost specification 217. The trust profile 221 is then evaluated by the trust evaluation module 223 to determine if the resulting profile meets the overall requirements for the designated system that the user has described, as set forth in the trust specification 225. In one embodiment, the trust specification 225 incorporate the aggregate of the system specification 203, functional specification 213 and cost specification 217.

In another embodiment, the trust profile can be computationally reduced into a single scalar such as an integer (e.g., a trust signature) that can be relied upon as a summary of the preceding computations. That trust signature can then be used, based on a trust specification 225 input from the user, to determine if the system meets user-defined trust requirements. For example, the user may input a trust specification 225, describing the user's minimum value for a trust signature to satisfy, into the trust evaluation module 223. The trust evaluation module 223 then computationally evaluates the suitability of the trust profile 221 and trust signature. For example, if the trust decision is positive (i.e., the trust signature based on the trust profile 221 exceeds the user's trust specification 225), then the system can be accepted (step 227). On the other hand, if the trust decision is negative, then the designated system can be modified by returning to the system specification module 201 for changing, updating, or adding new assets 101 or attributes 111 to the system specification 203, thereby facilitating recurring combinations to determine whether a suitable trust decision can be reached.

In another embodiment, a trust signature can be used to mark electronically stored and communicated information as trustworthy. Specifically, the electronic information can be tagged with the trust signature of the source that collected, processed, or otherwise produced the information, much like a digital signature that is used to mark the identity of the source. Unlike the digital signature, however, the trust signature indicates whether the source can meet the user's standard of trust.

Although, in the preceding embodiment, the functional evaluation 211 precedes the cost evaluation 215, the sequential order of these and their related processes may be reversed or performed in parallel without departing from the invention. In addition, at any time the functional evaluation 211 or cost evaluation 215 fails to meet the related functional specification 211 or cost specification 215, the user may return back to the system definition 201 to modify the designated system.

System Definition

Figure 3:
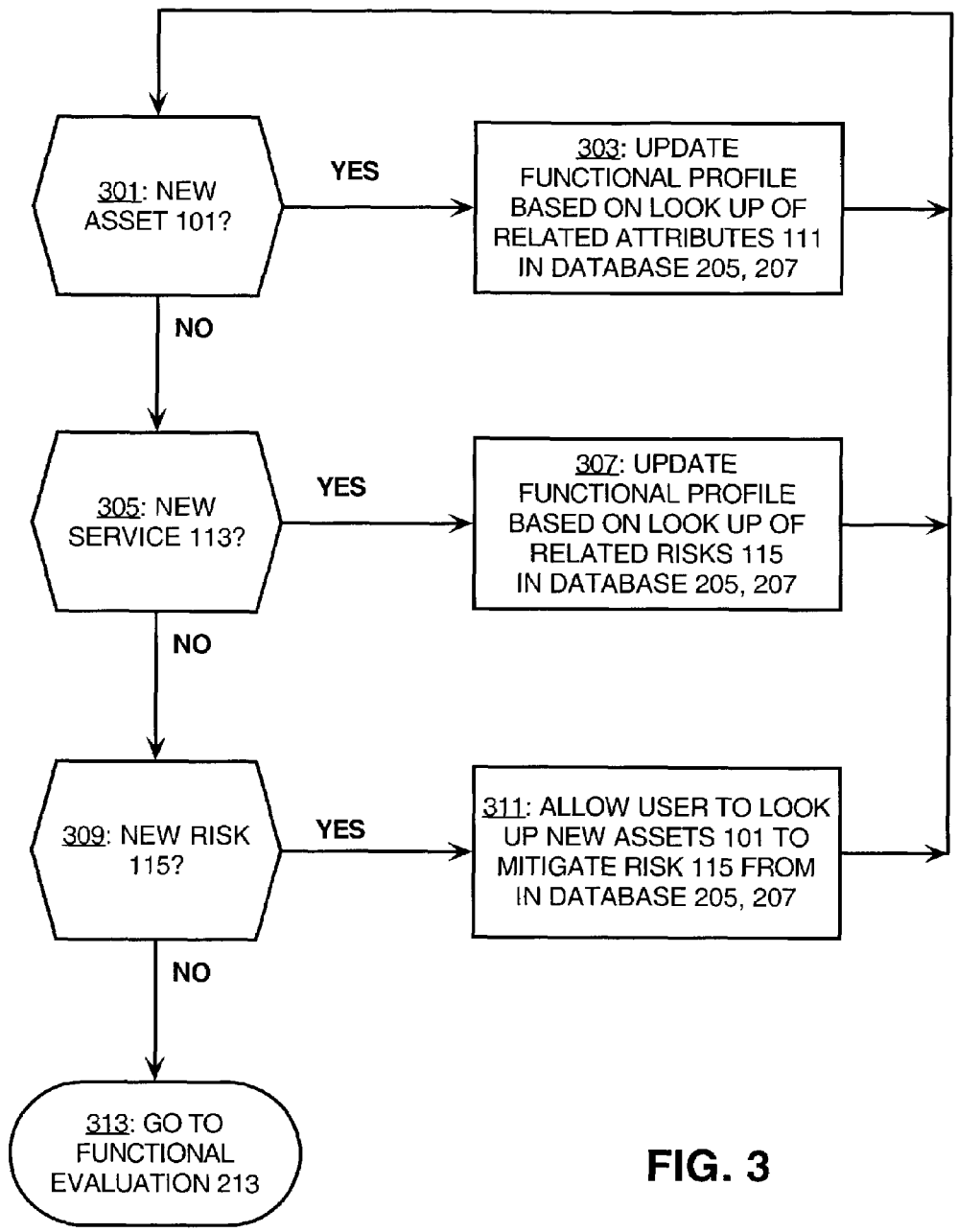
FIG. 3 is a flow chart showing the operation of an embodiment of the present invention.

FIG. 3 is a flow chart showing how the system definition module 201 depicted in FIG. 2 can work in response to the user's system specification 203. For example, if the user wishes to expand a designated system, the user may begin with the existing system specification and enter a new asset 101, such as a new resource 103 or a new code 105 (step 301). Thereafter, the system definition module 201 queries the attribute database 207 to look up the attributes 111 (e.g. services 113 and risks 115) that are related to the new asset 101. The looked-up attributes 111 that are related to the new asset 101 are then added to the functional profile 209. If a new asset is not previously recorded in the relevant asset database 205 and/or attribute database 207, the user is prompted to specify the related attributes 111. Similar queries and processes concurrently occur involving the asset database 205 and/or the attribute database 209 to incorporate related resources 103 and codes 105 into the system specification 203. The result is to assure that the listing for the new asset is complete and that all interdependencies related to that new asset among the assets and attributes of the designated system are identified.

For example, if the designated system that the user is defining is an e-commerce web site, the user may enter as the new asset 101 a specification to add a relational database management system for keeping track of online orders received from customers. The query to the attribute database 207 acquires descriptions, relating to the relational database management system, of the services 113 performed, such as recordation of customer orders, which are added to the system specification 203 and functional profile 209 of the designated system. The query also identifies risks 115 associated with the use of the relational database management system, such as a scalability risk in not being able to handle more than a certain number of concurrent customers. These risks are itemized and added to the system specification 203 and functional profile 209. The query to asset database 205 obtains listings for ancillary resources 103 (e.g. power, computers, related operating system software requirements) required to operate the order tracking system, as well as the codes 105 (e.g. business rules, tax codes) that must be satisfied in connection with performing the related order tracking activities. These additional assets 103 are itemized and added to the system specification 203.

As another example, the user may wish to alter the system specification 203 by identifying a new law to be met by the designated system. Once the user enters new codes 105 for the laws governing a legal sales contract, then the system definition module 201 looks up the applicable services 113 and risks 115 associated with the code 105. If services 113 and risks 115 are not associated with the inputted codes, the user is prompted to specify same into the system specification 203. To illustrate, in the case of contract law, the related service 113 performed is the production of a legally-enforceable contract, but the associated risks 115 may include a physical loss of the related digital records sufficient to prove the contract or the inability of the operator of the system to provide adequate testimony regarding the system's operation. Each of these types of risks has been demonstrated by judicial decisions to exist even if an enforceable contract is produced. The attribute database 207 will store and retain such risks and relate them to the relevant assets 103 and other attributes 111.

When the user enters a new service 113 (step 305), either directly via the system specification 203 or indirectly the output of step 303, then the system definition module 201 updates the functional profile 209, based on looking up the new service 113 in the attribute database 207 to obtain one or more risks 115 that are related to the new service 113 (step 307). This step implements the service-risk dependency depicted in FIG. 1.

Either directly via the system specification 203 or indirectly via the output of step 303, the user can also introduce a new risk 115 (step 309) into the functional profile 209. This may result from actual experience, whereby a user identifies a risk 115 not previously associated with the designated system. The system definition module 201 will then query the attribute database 207 to identify services that offset that risk, which may, in turn, identify assets 101 (consisting of resources 103 and codes 105) required to provide the service (step 311).

For example, following a lost effort to enforce a contract against customers outside of the jurisdiction of the United States, the user may enter that risk into the system specification 203 (e.g. enforceable outside the United States). To mitigate this extra-jurisdictional risk, the system definition module 201 may query the attribute database 207 to identify a service 113 to limit sales to United States addresses. That service will reference in the asset database 205 the programs and databases, as resources 103, and business rules requiring the input of a country identifier in the order form, as a code 105. Users might also be presented alternative combinations of assets to achieve the same service (e.g. a system configured to obtain the payment or credit card information first before fulfilling the order, or a system that checks Internet Protocol (IP) addresses to determine whether the Internet Service Provider (ISP) of the customer is based in the United States by a domain-name service lookup, etc.) Each of these options has their own different risks 115 (e.g. the first resource may result in less-than-expected transactions, and the second resource may be fooled by users who relay through an American ISP). A user would select one possible combination to include in the system specification 203.

The functions described as steps 303, 307 and 311 would occur with respect to each change in the system specification 203 and the resulting generation, directly or indirectly, of the new assets and attributes of the designated system. Thus, once each change has produced an update of the system specification 203 that reflects completely the new assets 101 and attributes 111, the resulting functional profile 209 is submitted to the functional evaluation module 211.

With respect to each new element included in a functional profile 209 submitted to the functional evaluation module 211, new weights may be required to be assigned by user input as part of the functional specification 213 to permit the functional evaluation module 211 to perform its calculations. Similarly, if the functional evaluation is affirmative, a similar new cost specification 217 may be required to be assigned as part of the complete cost specification 217.

Database Schema

As described above, the system definition module 201 and the functional evaluation module 211 interface with the asset database 205 and attribute database 207 to determine which assets 101 and attributes 111 are interrelated, and to augment the functional profile 209 with identified services 113 and risks 115. While the present invention is not limited to any particular database structure, one exemplary database schema used in a relational database management system for implementing these relations is shown in FIG. 4.

In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology. Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

FIG. 4 shows a portion of the exemplary schema relating to the asset database 205 for records relating to codes 105. Specifically, the exemplary schema includes a codes table 400, a related codes table 420, a related services table 430, a related resources table 440, a related risks table 450, and an evaluation table 460.

Specifically, codes 105 indicate, in connection with specific services 113 and risks 115, behavioral instructions. Codes 105 describe conduct that is required in connection with a designated system in order to produce a particular service 113 or to avoid the occurrence of a particular risk 115. The conduct described can be that of an individual person, organization or the system being evaluated for trustworthiness.

Codes can encapsulate mandatory conditions precedent required for the performance of a specific service 113; conduct that must be performed concurrently as part of a specific service 113; or prohibited actions which, if they occur, result in the occurrence of one or more related risks 115 (such as the failure of the service 113 to be completed).

The codes table 400 records listings, on each row, for any rule that is applicable to the performance of services 113 or the operation of the designated system. Although many software applications work to implement the rules set forth in codes 105 (which can be official laws or can be business rules at a very detailed level), the codes table 400 does not, in one embodiment of the present invention, include listings for actual software applications. Rather, those software are considered as resources 103 and are specified in other tables in the asset database 205. Nevertheless, the codes table 400 serves to organize and structure the rules the software application implements into a set of listings with permanence and scalability.

One embodiment of the present invention permits a classification scheme can be used to organize the codes 105 associated with a designated system, thereby allowing rapid comparison between designated systems and more rapid design of new systems. The classification scheme also allows normalization between apparently disparate codes 105 and permits sub-classification until a point of indifference is reached, on a consistent basis.

With respect to information systems, many of the actions or behaviors to which codes 105 are directed relate to conduct that occurs in connection with specific types of information objects (bytes, data elements, directories, listings, messages, documents, transmissions, etc.) that are the focus of selected services 113. The same process used to develop listings described earlier can be employed to identify relevant codes 105 and to develop appropriate organizational structures and listings.

To illustrate how codes 105 can be organized and specified, the structure of the codes table 400 will be described in relation to a specific example of the Statute of Frauds, which governs the enforceability of certain commercial contracts for the sale of goods in the United States. However, this example is illustrative and not limiting, since the present invention can be analogously applied to other code regimes as set forth in the referential digital sequence described below.

The purchase contract is a vital information object in commerce. In the evolution of electronic commercial practices, one of the early and persistent questions related to whether, and how, an enforceable contract could be produced by electronic means. In some industries and product segments, paper-based contracts remain substantially in use. According to surveys, a major reason for the continued reliance on paper contracts is a lack of trust in the computer-based alternatives. Therefore, there is a long-felt and continued need to design one or more systems, and evaluate the trustworthiness of those systems, for producing enforceable electronic sales contracts.

A starting point of this design, in accordance with an embodiment of the present invention, is to identify the applicable codes 105, usually set forth in legal statutes and regulations. Although not previous appreciated in the art, these codes 105 actually suggest the services 113 the designated system must provide in order to produce enforceable sales contracts. Once structured listings in codes table 400 are developed for the codes 105, lists for the related resources 103, services 113, and risks 113 can be produced within a cognate classification system.

In the United States, for example, the ability to enforce a sales agreement is established under the Statute of Frauds (Section 2-201 of the Uniform Commercial Code). Here is the text of that law, which is incorporated into the statutes of each of the 50 states: "a contract for the sale of goods for the price of $500 or more is not enforceable by way of action or defense unless there is some writing sufficient to indicate that a contract for sale has been made between the parties and signed by the party against whom enforcement is sought or by his authorized agent or broker. A writing is not insufficient because it omits or incorrectly states a term agreed upon but the contract is not enforceable under this paragraph beyond the quantity of goods shown in such writing."

Accordingly, the Statute of Frauds can be then analyzed to create a structured set of listings that represent its contents, each identified by a unique key 401. Here is a simplified illustration of that process. This illustration is merely intended to be representative of a subset of the Statute of Frauds and is not a complete presentation of the full analysis and implementation of the invention with respect to the Statute of Frauds.

An important variable in organizing codes 105 is identifying, in the first instance, the origin of the codes 105, as a matter of the sponsor or author (whether a governmental or private entity). Encapsulation of this information in a jurisdiction column 405 is facilitated by a decimal-based architecture referred to herein as a "referential digital sequence" (RDS). Although numbers are illustrated in base 10 notation, other bases, such as base 256 or base $2^{16}$ can be used.

One implementation of a referential digital sequence for a jurisdiction column 405 relies upon hierarchical structures of geography and regional laws. Accordingly, as part of the listings for the Statute of Frauds, the relevant jurisdiction 405 or author is preferably entered in accordance with its referential digital sequence. The referential digital sequence also provides an organizational structure into which local law variations may be organized and classified. Local law variations may exist as a result of different wording within the statutes, and judicial interpretations of a statute will also constitute variations. Consequently, the referential digital sequence for a jurisdiction 405 is organized to include both primary and subsidiary jurisdictions. In one implementation, there are five classes (using U.S. based terms): region-nation-state-county-city.

For example, the referential digital sequence specifying the jurisdiction for the Statute of Frauds as enacted in the state of Ohio is: "1.1.24.0.0" wherein the first 1 stands for the continents of North and South America, the second 1 for the United States of America, the 24 in the third position stands for Ohio. Codes of 0 in the county and cities places mean that the listing is applicable to all county and cities by default (i.e. unless a more specific list for that county or city has been entered into the codes table 400). Jurisdiction references can be sequentially stated, or grouped in sets, when appropriate. So, if referencing the Statute of Frauds as enacted in all of the states, the Jurisdiction reference is 1.1.99.0.0 (all). If the code 105 is authored by a non-governmental organization, such as a trade association (e.g. a manufacturers association), a referential digital sequence number is also entered, in the referential digital sequence keys into a look-up table with the appropriate details.

The actual jurisdiction or jurisdictions that apply to the designated system can be entered as part of the system specification 203. Such designation causes the selection of appropriate codes 105 to also be entered as part of the system specification 203. Alternatively, if the designated system is to provide services 113 to, or be transferred between, additional jurisdictions, those jurisdictions can be specified later, e.g. as part of the functional specification 213.

Another column in the codes table 400 is the code category 403. Once the jurisdiction 405 reference has been identified, it is useful to categorize the nature of the code 105 and its applicability. Establishing the nature of the code 105 helps with subsequent decisions as to whether the code's 105 applicability is mandatory or discretionary, and also allows sub-analysis of any conditions precedent that must be satisfied for the codes 105 to apply (for example, to particular services 113, risks 115, resources 105, and even other codes 105).

TABLE 1 shows a selected subset of the referential digital sequence identifiers (RDS) an be used for a code category 403:

TABLE 1

| RDS | CATEGORY |
| --- | --- |
| 1000000 | Official Law |
| 1100000 | Constitution |
| 1200000 | Statute |
| 1300000 | Regulation |
| 1400000 | Judicial Opinion |
| 1500000 | Official Practices (written) |
| 1600000 | Official Practices (identified but not written) |
| 2000000 | Trade Codes |
| 2100000 | Industry Codes (such as Self-regulatory Organizations) |
| 2200000 | Industry Practices (written) |
| 2300000 | Industry Practices (identified but not written) |
| 3000000 | Corporate Codes |
| 3100000 | Corporate Policies |
| 3200000 | Corporate Manuals |
| 3300000 | Corporate Guidelines |
| 3400000 | Department Policies |
| 3500000 | Department Manuals |
| 3600000 | Department Procedures |
| 40000000 | Contract Terms |
| 50000000 | System Operations |

The listing for the Statute of Frauds is, therefore, within 120000. Continued classification is based on increasingly specific features of the type of activity that is the subject of regulation by the Code. For example, a referential digital sequence for the Statute of Frauds may appear as: 123220, where 12=Statute, 3=Commercial Law, 2=Sales, and 201=Statute of Frauds.

Prior to the invention, there is no uniform structure for the organization of codes 105, whether for designing or evaluating systems or for other purposes that is scalable to meet the complexity of the codes themselves. For example, with respect to official laws and regulations among different jurisdictions, different identification and structural systems can be employed. At the same time, there is virtually no known method or practice for organizing non-governmental rules, regardless of the author, into a structured system that is capable of reference, analysis and reliance on an integrated basis, including with official rules. However, the above described referential digital sequence (RDS) methodology enables such a structured organization of rules 105 to be attained. In addition, such a methodology also enables a similarly structured organization of the services 113, risks 115, resources 103, and costs 121 to be attained, as illustrated by the further discussion below.

After classifying the Statute of Frauds, the specific code 105 is further deconstructed into a series of rules that are increasingly binary in function. Each rule receives a separate listing and is described by a descriptor 407 using a referential digital sequence and a behavior 409. Listings may relate other listings to establish the meaning of specific controls stated within the code 105 to which a listing relates.

Various notational or system classifications may be used to actually state the behavior 409 required by the code 105 (such as if-then logic statements). Many rules set forth in legal materials are capable of being translated into rule structures more familiar to computer-based information systems. Moreover, some regulatory structures are beginning to establish rules within the syntax of computer-based systems (for example, the regulations controlling the structure and processing of messages containing personal information that are communicated in connection with the processing of health-related payment claims under federal law). Accordingly, the behavior 409 can specify by reference computer instructions to evaluate the behavior of the listing.

Exemplary descriptors 407 and behaviors 409 for the Statute of Frauds in Ohio is shown in TABLE 2, in which capitalized words highlight controls or codes for which different listings exist.

TABLE 2

| JURIS. 405 | DESCRIPTOR 407 | BEHAVIOR 409 |
|---|---|---|
| 1.1.24.0.0 | 232201 | Statute of Frauds |
| 1.1.24.0.0 | 232201.1 | CONTRACT applies to a SALE |
| 1.1.24.0.0 | 232201.1.1 | Sale of GOODS |
| 1.1.24.0.0 | 232201.1.1.1 | Goods value is OVER $500 |
| 1.1.24.0.0 | 232201.1.1.1.1 | Contract states QUANTITY |
| 1.1.24.0.0 | 232201.1.1.1.1.1 | Contract includes SIGNATURE |
| 1.1.24.0.0 | 232201.1.1.1.1.1.1 | Signature is that of the party AGAINST WHOM enforcement is sought |
| 1.1.24.0.0 | 232201.1.1.1.1.1.2 | . . . the party's AGENT |
| 1.1.24.0.0 | 232201.1.1.1.1.1.3 | . . . the party's BROKER |

Referring back to FIG. 4, a listing for a rule requiring, in the context of the Statute of Frauds as enacted in Ohio, that the signature on the contract is that of the party's broker against whom enforcement is sought, is shown in codes table 400 as row 411. Row 411, which has a unique key 401, a category 403 of 1232201 indicating that the code is an official statute enacted at the state level relating to commercial sales contracts, a jurisdiction 405 of 1.1.24.0.0 indicating that the jurisdiction is Ohio, and descriptor 407 of 232201.1.1.1.1.1.3 indicating that there is a requirement that the signature on the contract is that of the party's broker against whom enforcement is sought. The unique key 411 can be determined on the physical address of the row in physical storage or logically from a unique combination of the category 403, jurisdiction 405, and descriptor 407. Behavior 409 descriptions may be text-based, of variable length.

The Statute of Frauds has been the source of substantial litigation, including, for example, regarding the authority of an agent to sign a writing on behalf of the party against whom enforcement is sought. These results are stated in judicial decisions, producing a different set of codes 105. For example, the listing for a decision by a county court (e.g., located in Muskegon County, which has a referential digital sequence of 1.1.24.38), ruling that the authority of an agent must be known by the party seeking enforcement, may be classified as shown in row 413 of the codes table 400, with the changes of the items from 411 (for illustrative purposes) in bold face.

Companies routinely adopt business rules regarding the authority individuals have to act on behalf of the company, including, for example, limits on the amounts to be expended on purchases of goods. A set of listings that relate to rules regarding the maximum dollar amount to be spent by an employee (as an agent of the employee) located anywhere in the United States to spend on goods appears in rows 415 and 417 of codes table 400. Row 415 corresponds to those employees having the authority to disburse amounts under $200, and row 417 corresponds to those having the authority to disburse amounts under $500. (These changes are again, for illustrative purposes, in bold face.)

In addition to the Statute of Frauds, any party seeking to introduce records complying with the rules of the Statute must also satisfy a set of rules governing the admissibility of those records as evidence into appropriate judicial venues. Generally, these rules do not specifically apply to purchase contracts but instead to business records in general. However, those rules have been interpreted by judicial decisions specifically addressing the admissibility of the record to satisfy a Statute of Frauds, including the media on which the record is inscribed. One such illustrative listing is shown in row 419, which indicates that the listing is for a rule of evidence (hypothetically, within category 403 of 1413010), by the Ohio Supreme Court (jurisdiction 405 of 1.1.24.0.0), for admissibility of business records in the form of electronic mail (descriptor 407 of 110700.72.2.1.203).

The exemplary schema enables the cross-reference and the assembly of related sets of resources 103, codes 105, services 113, and risks 115, and this cross-referencing of related assets 101 and attributes 111 enables steps 303, 307, and 311 of FIG. 3 to be implemented using relational database queries and join operations.

As discussed above, the Ohio Supreme Court ruling on the admissibility of electronic mail business records will govern the admissibility of signatures under the Statute of Frauds. This relationship can be captured in a related codes table 420, which has two columns 421 and 423 indicating the codes to be linked. In this example, the broker signature code under the Statute of Frauds at row 411 can be linked to the judicial ruling listed at row 419 by placing an entry in related codes table 420 that includes keys for both row 411 and row 419. Organized in this manner, the related codes for each row in codes table 400 by doing a relational database join operation on related codes table 420.

The development of a complete set of listings for a specific code 105 provides a resource to the users from which to define and evaluate both designated systems and their respective assets 101 and attributes 111 for a system specification 203. For example, compliance with the Statute of Frauds produces a legal privilege, i.e., the right to be able to enforce an agreement meeting the essential requirements. This right is, in fact, a service 113. This information can be captured in the exemplary database schema in related services table 430, which associates a key for the specific code listing in code column 431 and a key for a specific service listing in service column 433, which may then be correlated by doing a join operation on the related services table 430. This allows step 303 in FIG. 3 to be implemented using relational database commands.

If, on the other hand, the conditions of the Statute of Frauds are not satisfied, then there is not a right to enforce. That is, in fact, a risk 115 (even though it is the affirmative result of the Statute of Frauds itself, as a code). Information about this risk 115 can be captured in the related risks table 450 of the exemplary database schema. More specifically, the related risks table 450 associates a key for a specific code listing in code column 451 and a key for a specific service listing in risk column 453, enabling step 303 in FIG. 3 to be implemented using relational database commands.

In fact, the deconstruction of the listings for the Statute of Frauds provokes the creation of additional linked and related listings of additional services 113 and risks 115. For a designated system to produce the key service 113 of an enforceable contract, there is also the need for services 113 to be performed that meet each of the sub-category requirements represented by each listing. For example, there must be a writing (or other "record" as defined in code listings), there must be a statement of quantity, there must be a record of value, there must be a signing or signature, that signature must meet applicable requirements (such as code listings for evidentially acceptable proof), there must be evidence the contract is for a sale, and there must be evidence the contract is for the sale of goods. Each of these services 113 and their attendant risks 115 is recorded in the related services table 430 and related risks table 450.

To make relations between codes 105 and resources 103 a related resources table 440 can be provided to link a code 441 with a resource 443. This can be useful, for example, to relate the rules which a particular software application may execute (as codes 101) to the software application itself (as a resource 103).

Although the architecture of database schema has been described in detail for organizing code 105 listings, the referential digital sequence (RDS) architecture also permits resources 103, services 113, and risks 115 to be organized and described in a corresponding structure. For example, resources 103 in the asset database 205 has a resources table, a related codes table, a related services table, a related resources table, and a related risks table. The corresponding resources table, services table, and risks table therefore contain columns for the category 403, descriptor 407, and behavior 409 designed in accordance with the referential digital sequence. The key 401 within the codes table 400 and corresponding tables for resources, services, and risks are unique, thereby permitting distinctions among listings with comparable referential digital sequence descriptors in different classes. However, code-specific columns such as jurisdiction 405 may be replaced by columns that are appropriate to the type of element to which the table relates. For example, an implementation of the resource table has a columns for presenting a serial number or product code of a physical component and the component's supplier or vendor.

Many lists, schedules or directories exist which attempt to classify risks in the context of executing risk management services. These resources can be used to accelerate the formulation of referential digital sequences and provide the practitioner a means for inducing the existence of additional elements and their relationships. For example, there exist electronic component catalogs and automotive part catalogs which have itemized and identified various components that can be included in a system specification 203 as resources 103.

In one embodiment of the invention as described below, a user can register a designated system as a resource 103 in the system 200. This registration will allow other users to specify their designated systems using the designated system as a resource. When this occurs, the updating of the functional profile 209 of such designated systems incorporates the services 113 and risks 115 of the registered designated system.

Functional Evaluation

Referring back to FIG. 2, the function evaluation 211 evaluates a functional profile 209 in accordance with a functional specification 213 input by the user based on data present in the asset database 205 and the attribute database 207. This data can be organized as an evaluation table 450 depicted in FIG. 4, which contains information useful for performing a functional evaluation of the assets 101 and attributes 111 present in the functional profile 209.

In one embodiment of the present invention, the evaluation table 460 includes a key column 461 to cross-reference the elements of the designated system to be evaluated, specifically to the service 113, risks 115, resources 103, and codes 105 of the designated system. Furthermore, the evaluation table 460 includes several evaluation parameters, including a weight 463, a frequency 465, a rating 467, and a probability 469. These parameters, and their role in the functional evaluation, are described as follows; however, the present invention is not limited to these specific parameters and additional or different evaluation parameters (such as actuarial dollars) may be introduced or substituted respectively without departing from the present invention.

The weight 463 of an element can be stated as an integer to give different elements different weights. A weight 463 is a means for capturing the subjective value or importance of a particular element, as that value may be expressed by a user, operator, or sponsor of a system 200. One use of weights 463 is to establish the user's indifference to certain services and risks involved in the designated system. For example, a proposed designated system may do more services 113 than the user wants. Because the user's trust decision does not depend on services 113 that the user considers irrelevant to the user's goals (e.g. an automobile loaded with optional features), those extraneous services 113 should not factor mathematically into the trust profile 221. This can be done by assigning a zero (0) weight to the service, which can be multiplied against other evaluation parameters. Similarly, there are certain risks 115 that to which the user is indifferent and would like to ignore (e.g. the risk of an asteroid collision with the planet). These risks can be ignored by assigned a zero weight 463.

Another purpose to the weight 463 of an element is to impose a higher risk premium than what would ordinarily be actuarially justified if the user is particularly risk averse. For example, a supplier of secure banking services may be more risk averse than the typical on-line e-commerce vendor, thereby resulting in greater weight 463 being assigned to certain attributes 111.

Because the weight 463 is designed to capture the user's subjective value of resources 103, codes 105, services 113, and risks 115 as detailed in the functional profile 211, the value of the weight 463 is typically obtained through the functional specification 213 provided by the user. However, the system 200 can also initialize the weight 463 with a default value on an arbitrary basis, based on sampling other users, or based on the experience and judgment of the author of the relevant listing. Over time, weights 463 can be adjusted based on historical experience and the effect of performance data, as presented in further detail below. For example, various users could state their own weights 463 and the directory listing could reflect an average of their valuations.

The frequency 465 of the element can be stated as an actual count of the number of times the element has been experienced in the context of a sponsor, operator or user of the system (or any other class of such parties). Frequency 465 is an important variable in trust decisions, particularly regarding attributes 111 and costs 121. Trust decisions are probability-based, and actual experience best equips a potential user of any tool to evaluate its suitability for a given new task. Actual experience can be an important variable in sizing the designated system to facilitate trust analysis.

The rating 467 relates to the quality of the historical experience reflected by the frequency 465. As operators, sponsors and users have direct experience with the designated system or its elements, those people also have evaluative reactions. For example, one popular web-site provided both buyers and sellers a feedback and rating tool that has become one of the most important utilities in facilitating informal "trust" determinations within their trading community. Similarly, any user of any tool makes judgments regarding how well a tool performs against predefined requirements. Another manner of looking at the rating 467 is like a batting average, how well did the particular element do its intended job when actually used? Rating 467 is capable of being computed based on the successful execution of transactions within any system that displays or utilizes the related element. Ratings 467, for well-designed, frequently-used systems, should be extremely high. Ratings for new systems should be lower, simply because of the lack of experience with the new system. Ratings 467 for risks 115 or negative costs 125 should be low for well-designed, frequently-used systems but high for new, unproven systems.

The probability 469 relates to the occurrence of the element, and in one embodiment probability 469 can be stated as a decimal fraction. The probability 469 may also be calculated based on the presence or absence of specific assets 101 in the designated system. Other means of calculating probability 469 can be used, or one or more existing models that already exist can be incorporated, including those associated with the actuarial computations associated with insurance underwriting services. Preferably, consistent computational methods for valuing the probability 469 scores are employed to reflect actual experience within various classes of the elements designated system, with the occurrence, or failure to occur, of specific services 113 and risks 115. Probability calculations may be dependent upon the existence or occurrence of other elements in the designated system. Indeed, one of the useful functions of an embodiment of the invention is to establish, record and permit the automated evaluation of the accuracy of probability calculations for various systems. Therefore, the meaning of trust migrates from speculation or conjecture toward a structured, transparent decision based on an accounting and measurement of the performance of a system against fully defined requirements.

Under continued use, practitioners can develop historical understandings of the relationships among different elements of the system. This historical experience can provide referential resources, stored in the repository, that provides for rapid assessments of the trustworthiness of any particular system (and its elements) in order to facilitate improved and more accurate decisioning regarding the use of that system in particular circumstances. Expert systems and other artificial intelligence systems can be employed to discover the relationships among different elements in different systems and make available reports or analytical studies that can be implemented in the design and implementation of improved system architectures.

Accordingly, one embodiment of the invention permits additional information regarding the actual performance of systems to update the listings in the evaluation table 460 relating to the various elements. One implementation of this embodiment is shown in FIG. 5, where, following an affirmative trust decision (step 227), the trust profile 221 of the system (including those stated as a trust signature) can be registered with a registration module 501 that also will serve to receive from that system ongoing performance data 503 regarding functioning of the system and its elements.

When a system is registered with the registration module 501, that system is assigned an referential digital sequence number to identify the system, and the registered system can be added to the asset database 205 to allow other users of the system 200 to evaluate the use of the registered system in their own systems. Furthermore, if the registered system produces electronic information, that information can be tagged with the trust signature of the referential digital sequence and/or with the referential digital sequence number of the registered system. This permits recipients of the outputted information to evaluate the trustworthiness of the registered system in connection with receiving the information, including receiving the information into the respective systems of the recipient. Since a recipient may have different weights 463 relevant to the trust profile 221 of a system, the recipient's trust evaluation of the registered system from which the information has been outputted may be different than the trustworthiness assigned by the user of that registered system.

The performance data 503 can be collected, analyzed and distributed among the relevant databases regarding different elements (i.e., the asset database 205, the attribute database 207 and the cost database 219). The database entries for the elements and the registered system can be updated so specific fields relating to the various scores in the evaluation table 460 can accurately reflect the actual performance. The successful performance by a designated system of defined services 113 by known resources 103 in a manner that does not violate the requirements of related codes 105 or experience the occurrence of identified risks 115 will increase the trustworthiness of a designated system and/or its component elements.

Cost Evaluation

Historically, trust decisions—considered qualitative in nature—regarding particular systems have resisted logical relationships to economic measurements, which are quantitative. Yet, economic costs are controlling determinants in the decision whether to trust a system. One implementation of the present invention permits costs 121 associated with a designated system, as a whole, or the costs 121 associated with identified resources and attributes of a system, on a selective basis, to be analyzed in order to facilitate trust decisions. This use of this implementation of the invention may proceed differently from the different perspectives of an operator, user, or sponsor of a system.

For example, operators would like to be able to determine whether they can afford to construct or operate a designated system that will meet certain user requirements (stated in trust profile 221). That decision, conducted on an ongoing basis in most situations, involves evaluating, on a net basis, the overall reliability of a designated system, an assessment of the resources 103 and codes 105 required for the designated system's operations, an evaluation of the likelihood of associated services 113 (including income) and risks 115 (including losses), and a calculation of the related costs 121 (including income and operating expenses).

An operator may use an embodiment of the invention to: compare the costs associated with the use of particular resources 103 or codes 105, either independently or on a comparative basis. For example, certain resources 103 may have costs 121 which, on a net basis, are less than the costs of certain codes 105 which are intended to achieve the same result. A operator can also assess whether the design of the system to produce certain services will produce positive costs 123 which outweigh their implementation (stated as negative costs 125) by improving the overall trust value of the system. Another use is to calculate the negative costs 125 associated with certain risks 115 for which no adequate resources 103 or codes 105 provide mitigation and, as a counter-measure, the expenses associated with obtaining insurance which would provide economic recourse if any of those negative costs 125 were realized. In addition, the operator can evaluate whether, on a net basis, the costs 121 associated with the use of certain resources 103 or codes 105 based upon certain public standards (such as technical standards, whether adopted by the International Standards Organization or similar organizations) are favorably or unfavorably compared to the costs associated with the use of certain resources 103 or codes 105 which are not based upon public standards.

Users would like to determine whether they may trust a system to perform intended services 113 (including those associated with positive costs 123) without incurring unacceptable negative costs 125 (including those associated with the occurrence of particular risk 115). A user may use an embodiment of the invention to evaluate the net costs 121 associated with the use of a designated system; in some instances, for example, trustworthy systems may be excessively expensive to be employed by a user. The user can also comparatively assess different systems that offer different measures of trustworthiness and related costs. In some instances, the net costs (i.e., the cost component) associated with a less trustworthy system (i.e., the functional component) may nevertheless support a decision to use that system, since the resulting trust profile 221 may still meet a user's trust specification 221. In comparing two or more systems, or by eliminating assets 101 and attributes 111 that are comparable between the two systems, the user may isolate particular services 113 or risks 115 associated with a particular system and evaluate the costs specifically associated with such attributes. The criteria of a user can be stated for selecting or utilizing a system (in the form of a system specification 203, functional specification 213, trust specification 225 or an overall trust profile 221), and facilitate negotiations between a user and the operator of a system regarding whether the system matches a user's criteria.

In this embodiment, since a user and an operator may assign different weights 463 to different system elements, a system that is considered trustworthy by the operator may or may not meet the requirements of the user. In addition, the system 200 can facilitate negotiation between a user and an operator of a system in which the cost component associated with different system requirements can be comparatively evaluated and a user and an operator may negotiate (by other means) alternative system configurations that may be mutually acceptable.

Sponsors would like be able to determine whether they may trust a system to be of appropriate trustworthiness (and value) to potential operators or users. Sponsors may include any type of organization evaluating systems for use by their constituents (governments, schools, trade associations, merchant networks), persons asked to license particular systems (such as medical devices, or systems operated by certification authorities) or policymakers assessing whether certain types of systems, to be trustworthy, require the existence of certain legal requirements, in the form of codes 105.

A sponsor can use an embodiment of the invention to quantitatively evaluate the functionality of specific codes 105 across different systems or a particular system by observing whether the risks 115 such codes 105 are intended to mitigate occur with the frequency 465 and negative costs 125 that might be hypothesized for those systems. For example, a sponsor could identify the risks 115 associated with a particular system (and the related negative costs 125) and determine whether either or both (a) additional codes 105 must be authored and mandated in order to mitigate those risks or (b) additional resources 103 must be acquired, performing particular services 113 which offset the identified risks 115 with suitable controls. The comparative effectiveness of different resources 103 or codes 105 can be assessed in producing intended services 113 and avoiding related risks 115, and make suitable determinations as to whether to require different combinations of a system's assets 101. Moreover, sponsors can comparatively evaluate multiple systems in order to analyze, in isolation, the costs 121 associated with those systems and their respective elements (resources 103, codes 105, services 113, and risks 115) that are unique and not shared between the evaluated systems.

Trust Evaluation

Nearly any system will be unique when analyzed, yet the ability to achieve computational evaluations of trust requires the capacity to rapidly evaluate the points of congruity between different systems in order that their genuine differences can be isolated and trust decisions based accurately on those differences.

Systems also evolve, both within their construction and in the broader context of experience and, for information systems, network-based evolutionary changes are particularly dynamic. Internet-based information processing services are exemplary of this evolutionary process. Evaluation of the differential trustworthiness of systems is built upon the concept that systems are dynamic and evolve. This permits analytical procedures that are comparable in methodology between system evolution and biological evolution. When changes in systems are translated into multivariate data sets and capable of being comparatively displayed, those changes can be powerfully understood, both for historical analysis and for the performance of predictive modeling of results under different circumstances.

In effect, the invention permits relationships and synergies among systems and their different elements and trust profiles 221 to be mapped in much the same manner as the individual genes of DNA have been identified and mapped and studied. Similar to a living organism, a system may be characterized as a dynamic mechanism, capable of evolution through modifications by operators, users and sponsors. Though a trustworthy system may exist and be used for its intended purposes, its ongoing performance against defined requirements will either increase or decrease its trustworthiness as a tool to be selected for the performance of future work. Similarly, systems that are not trustworthy can be modified to correct their inadequacies or abandoned. Embodiments of the invention provide a structure and process for the analysis of these processes.

One aspect of the invention relates to the use of mathematical techniques to visualize and evaluate the trustworthiness of a system or the differential trustworthiness of two or more systems under consideration. The different systems can be different solutions offered by different operators or sponsors, or two different versions offered by the same operator. While the invention is not limited to any one particular mathematical technique by which to visualize trustworthiness, one technique includes the use of Procrustes analysis.

Procrustes analysis is one of several mathematical techniques that can be used to evaluate multivariate data sets; it is often used to compare the shapes of two or more objects. Variations in size and shape between objects, when presented in three-dimensional space, disclose information regarding their construction that can be useful for comparative analysis. The use of Procrustean-based geometry forces similarities between objects to offset one another in order that true disparities in certain characteristics (referred to as principal components) can be revealed. Objects are computationally transformed, rotated and scaled to achieve that result.

Procrustes analysis has recently been applied in paleontological research and, as well, in biological research to study ecological and evolutionary relationships. Research has tentatively begun to examine the effectiveness of Procrustes superimposition methods in predicting results under different scenarios for evolutionary patterns; these methods provide an analogous process by which the changes in systems that result from the introduction or subtraction of different elements, or the impact of ongoing performance data on the weights provided to those elements, can be considered in terms of trustworthiness.

Two aspects are particularly advantageous in the successful application of Procrustes analysis to the trust evaluations that may be performed through the invention. First, the architecture of the information available in the relational databases, including the referential digital sequence (RDS) methodology, allows for the trust profile of a system to be indexed and for its elements (and evaluation parameters), taken as a whole, to be mapped and visualized as a three-dimensional shape object, capable of being manipulated mathematically through the transformation, rotation and scaling exercises of Procrustes analysis. Second, the scoring and weights (i.e. the evaluation parameters of weight 463, frequency 465, rating 467, and probability 469) of particular elements create variation and magnitude, both among individual elements and complete systems, which allows for comparative analysis between systems that can be evaluated in terms of trustworthiness.

Based on the preceding, one aspect of the invention pertains to the presentation of the different elements of a system (contained in the listings within the database schema of FIG. 4) in a three-dimensional manner that will permit a visual presentation of the elements, their scores and their relative relationships, as reflected by their respective listings. One way of organizing the elements of a system, initially, is in a three-dimensional space, defined by six different vectors organized into three axes composed of pairs of opposing vectors, with each pair representing the three principle classes of elements used in the trust analysis of a system—assets (resources, codes), attributes (services, risks) and costs (positive costs, negative costs), as shown in FIG. 6.

Referring now to FIG. 6, the asset axis 601 relates to the assets 101 of a system, specifically, the resources 103 on the positive side and codes 105 on the negative side. Among the assets, there is a principle that resources 103 are inversely proportional to codes 105—the more resources 103 are integrated into the system, the fewer codes 115 must be specified in relation to the system in order to achieve a trustworthiness acceptable to the user. This relationship is illustrated by the directional arrows imposed on the asset axis 601. A system is usually more trustworthy when resources 103 exceed codes 105 (once valued by the user through the functional evaluation 209), thereby relying more upon the system's functional components, rather than behavioral controls not tied to specific operations or processes, to manage the system's operations, procedures and user behavior, and the attendant risks 115. There may be situations in which it can be determined that a system involving few resources, particularly on a relative basis to other systems, is still trustworthy, but that will not be the usual case.

The attribute axis 603 relates to the attributes 111 of a system, specifically the services 113 on the positive side and risks 115 on the negative side. Among the attributes 111, there is a principle that services 113 are in opposition to risks 115, such that the greater the services 113 a system is expected to produce, the risks 115 are (at least) equal to, and often greater than, the related services (once valued by the user through the functional evaluation 209). This relationship is illustrated by the directional arrows imposed on the attribute axis 603. Of course, services 113 or risks 115 may be disproportionate for any particular system, based on the related assets 101 and costs 121. As stated earlier, a system, to be trustworthy, must produce, within the functional component, an evaluation of the services and risks that, on a net basis, allows the functional evaluation 211 to exceed the requirements of the functional specification 213. Generally, services 113 performed by a system must substantially exceed the valuation of the risks 115 associated with its use for a trustworthy system to exist. The actual balance becomes a function of the other dependencies among other elements, as well as the result of functional evaluation relating to each of the other elements.

The cost axis 605 relates to the costs 121 of a system, specifically the positive costs 123 (solid line) and the negative costs 125 (broken line). Among costs 121, there is a principle that positive costs 123 should exceed negative costs 125, on a net basis, in order for a system to be considered trustworthy. In addition, as presented earlier, a user may include in a cost specification 217 requirements that (a) the negative costs 125 must not exceed a maximum number, to be optionally specified, and (b) positive costs 123 must not be less than a minimum number, to be optionally specified. Since costs 121 are calculated based on the resources 103 and attributes 111 of a system, there is an additional principle that negative costs 125 tend be inversely proportional to resources 103. In other words, as more resources 103 are used, rather than codes 105, to govern related behaviors, the efficiency and reliability of those resources 103 should produce lower negative costs 125 (such as operating costs or costs required to correct human errors). Similarly, the positive costs 123 represented by the increased efficiency and reliability of automated resources 103 should produce greater positive costs 123 (which should produce a multiplier effect in netting positive costs 123 against negative costs.

As an example of the preceding, assume for a given system that positive costs are 55 and negative costs are 45 for a net positive cost of 10. If new resources are introduced, they both reduce negative costs and increase positive costs. Thus, following a new resource with a positive cost impact of 5, positive costs may go up to 60 and negative costs are reduced to 40, thereby creating a net positive cost of 20. This result logically improves the trustworthiness of a system.

Taken together, the paired vectors define a three-dimensional space in which the trust profile 221 of a system may be visually displayed in a manner that associates each element (based on the information stated in each listing) with coordinates in the three dimensional space. Connections among those coordinates, using available information visualization techniques can provide the framework for a three-dimensional object representative of a system. Precise locations are defined by the evaluation parameters for each element (e.g. asset 101, attribute 111, and cost 121) and the relationships among all of the elements, mapping the trust profile for the entire system. Another alternative means of presentation is for each element to be oriented at a center point within a three-dimensional space and arranged in an array, in which the attributes of each element can define a series of radius lines representing the various elements (FIG. 7).

Once mapped into a three-dimensional space, the invention facilitates visualization of a variety of design, analytical and evaluative services relating to the trust profile 221 of a system that can be performed through a variety of mathematical methods, and the invention is not limited to any particular means.

These means, including Procrustes analysis, allow, by example and not in limitation, the following services: as performance data for registered systems is distributed to the relevant databases (see FIG. 5), the evaluation parameters relating to each element (such as rating 467 and probability 469 in FIG. 4), as included in the relevant referential digital sequence (RDS) listing (see FIG. 4), will dynamically update; these changes will mathematically compute into new coordinates within the three-dimensional space for the visualized representation of the complete trust profile 221. An additional use may involve the development of a separate trust profile 221 reflecting the substitution of new resources 103 for selected codes 105. The two trust profiles 221 for the respective systems produce different visualized representations that permits a practitioner a different perspective on assessing the comparative trustworthiness of each system.

Certain principles that are identified as important can be tested and verified through experience with use of the system 200. Those principles include the axioms, for example, that positive costs 123 should exceed negative costs 125; services 113 should exceed risks 115, and that automated controls embedded within resources 103 are favorable to controls that are stated in codes 105 external to the system. In addition, experience with the use of embodiments of the invention in connection with one or more different systems yields the opportunity to evaluate and measure additional propositions regarding how different combinations of the elements constituting a system may influence the evaluation of the trustworthiness of that system.

Hardware Overview

Figure 8:
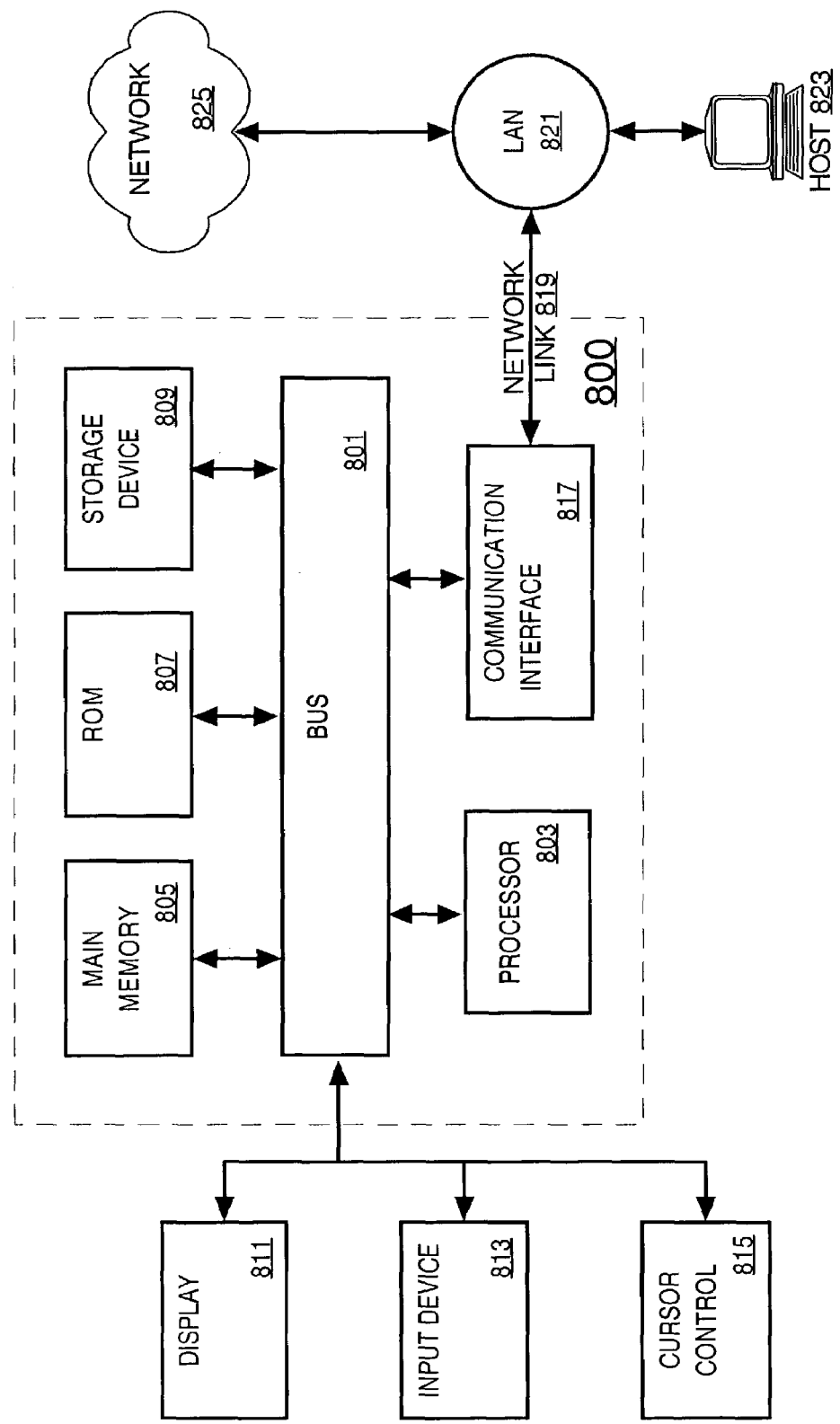
FIG. 8 depicts a computer system upon which an embodiment of the present invention can be implemented.

FIG. 8 illustrates a computer system 800 upon which an embodiment according to the present invention can be implemented. The computer system 800 is configured, by means of hardware and software, to perform techniques to evaluate systems. For example, the computer system 800 can include an expert system or other artificial intelligence system for identifying and capturing information relating to the assets 101, attributes 111, and costs 121 of the system, as well as a graphics engine for computing and displaying three-dimensional representations of trust profiles 221 on a two-dimensional screen.

The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions, such as asset database 205 and attribute database 207.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to one embodiment of the invention, systems evaluation is provided by the computer system 800 in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the present invention. Thus, embodiments of the present invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices, such as the source of the performance data 503 in FIG. 5. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and network 825 both use electrical, electromagnetic, or optical signals to convey information and instructions. The signals through the various networks and the signals on network link 819 and through communication interface 817, which communicate digital data with computer system 800, are exemplary forms of carrier waves bearing the information and instructions.

The computer system 800 can send messages and receive data, including program code, through the network(s), network link 819, and communication interface 817. In the Internet example, a server (not shown) might transmit requested code belonging an application program for implementing an embodiment of the present invention through the network 825, local network 821 and communication interface 817. The processor 803 may execute the transmitted code while being received and/or store the code in storage device 89, or other non-volatile storage for later execution. In this manner, computer system 800 may obtain application code in the form of a carrier wave.

The term "computer-readable medium" as used herein refers to any medium that participates in providing instructions to the processor 805 for execution. Such a medium may take many forms, including but not limited to non-volatile media, volatile media, and transmission media. Non-volatile media include, for example, optical or magnetic disks, such as storage device 809. Volatile media include dynamic memory, such as main memory 805. Transmission media include coaxial cables, copper wire and fiber optics, including the wires that comprise bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A method for evaluating a designated system, comprising;
    receiving input relating to the designated system;
    classifying the input into information about elements of the designated system;
    evaluating the elements based on evaluation parameters corresponding to each of the elements; and
    producing a representation of trustworthiness of the designated system based on the classified information.

2. A method according to claim 1, wherein the input further relates to external circumstances applicable to the designated system.

3. A method according to claim 1, wherein the representation of the trustworthiness of the designated system is capable of being displayed as vectors in a representation of a three-dimensional space, said vectors having a magnitude in accordance with the evaluated elements.

4. A method according to claim 3, further comprising:
    performing a Procrustes analysis with respect to the vectors in the representation in the three-dimensional space to compare with other vectors relating to other elements classified for another designated system.

5. A method according to claim 4, wherein each of the elements of the designated system and the other elements of the other designated system are classified in terms of a common referential digital sequence.

6. A method according to claim 1, wherein producing the representation of the trustworthiness of the system includes computing a trust signature stating the trustworthiness of the designated system based on the evaluated elements.

7. A method according to claim 1, wherein the evaluation parameters include a weight, a rating, a frequency, and a probability.

8. A method according to claim 1 further comprising:
    collecting performance data relating to operating the designated system; and
    updating the evaluation parameters based on the collected performance data.

9. A method according to claim 1, wherein the information about the element of the designated system includes information about positive costs and negative costs of the designated system.

10. A method according to claim 1, further comprising:
    identifying a risk that contributes negatively to the trustworthiness of the designated system;
    identifying an asset to mitigate the identified risk, wherein the asset includes at least one of a resource and a code;
    modifying the designated system to include the identified asset; and
    evaluating trustworthiness of the modified system.

11. A method according to claim 10, wherein the asset identified to mitigate the identified risk are assigned a common referential digital sequence number.

12. A method for evaluating a designated system, comprising:
    receiving input relating to the designated system;
    classifying the input into information about elements of the designated system,
    wherein the information about the elements of the designated system includes information about the resources and codes of the designated system; and
    producing a representation of trustworthiness of the designated system based on the classified information.

13. A method for evaluating a designated system, comprising:
 receiving input relating to the designated system;
 classifying the input into information about elements of the designated system,
 wherein the information about the elements of the designated system includes information about the services and risks of the designated system; and
 producing a representation of trustworthiness of the designated system based on the classified information.

14. A computer-readable medium bearing instructions for evaluating a designated system, said instructions being arranged, upon execution, to cause one or more processors to perform the steps of:
 receiving input relating to the designated system;
 classifying the input into information about elements of the designated system; and
 producing a representation of trustworthiness of the designated system based on the classified information.

15. A tool for evaluating a designated system, comprising a computer system configured to perform the steps of:
 receiving input relating to the designated system;
 classifying the input into information about elements of the designated system; and
 producing a representation of trustworthiness of the designated system based on the classified information.

16. A method for evaluating a plurality of designated systems, comprising:
 producing respective trust profiles for the designated systems based on information about respective sets of elements of the designated systems;
 comparing the respective trust profiles, the step of comparing including,
 receiving a set of weights corresponding to at least one of a designated service and a designated risk,
 evaluating the respective trust profiles in accordance with the set of weights to produce respective numbers indicating respective trustworthiness of the designated systems, wherein each of the trust profiles references a corresponding functional profile that lists services performed by the corresponding designated system and risks incurred by operation of the corresponding designated system, and
 comparing the respective numbers.

17. A method for evaluating a plurality of designated systems, comprising:
 producing respective trust profiles for the designated systems based on information about respective sets of elements of the designated systems;
 comparing the respective trust profiles, the step of comparing including,
 receiving a set of weights corresponding to at least one of a designated resource and a designated code,
 evaluating the respective trust profiles in accordance with the set of weights to produce respective numbers indicating respective trustworthiness of the designated systems, wherein each of the trust profiles references a corresponding functional profile that lists resources and codes, and
 comparing the respective numbers.

18. A computer-readable medium bearing instructions for evaluating the designated system, said instructions being arranged, upon execution, to cause one or more processors to perform the steps of:
 producing respective trust profiles for the designated systems based on information about respective sets of elements of the designated systems; and
 comparing the respective trust profiles.

19. A tool for evaluating the designated system, comprising a computer system configured to perform the steps of:
 producing respective trust profiles for the designated systems based on information about respective sets of elements of the designated systems; and
 comparing the respective trust profiles.

20. A method for evaluating a designated system, comprising:
 receiving input indicative of a code that regulates conduct of a person operating the designated system or services performed by the designated system,
 wherein the input employs a referential digital sequence for the code, said referential digital sequence being derived from a hierarchical decomposition of the code;
 identifying a risk associated with the conduct of the person regulated by the code; and
 evaluating the trustworthiness of the designated system based on the identified risk.

21. A method according to claim 20, wherein the referential digital sequence for the code can be used to identify elements of the system that can be deployed to address the identified risk.

22. A computer-readable medium bearing instructions for evaluating the designated system, said instructions being arranged, upon execution, to cause one or more processors to perform the steps of:
 receiving input indicative of a code that regulates conduct of a person operating the designated system or services performed by the designated system;
 identifying a risk associated with the conduct of the person regulated by the code; and
 evaluating the trustworthiness of the designated system based on the identified risk.

23. A tool for evaluating the designated system, comprising a computer system configured to perform the steps of:
 receiving input indicative of a code that regulates conduct of a person operating the designated system or services performed by the designated system;
 identifying a risk associated with the conduct of the person regulated by the code; and
 evaluating the trustworthiness of the designated system based on the identified risk.

24. A method for evaluating a designated system, comprising:
 receiving input indicative of assets of the designated system;
 identifying services performed by the assets and risks incurred by operation of the assets;
 receiving a set of weights corresponding to at least one of a designated service and a designated risk; and
 evaluating the designated system based on the set of weights, the identified services, and the identified risks.

25. A method according to claim 24, further comprising:
 receiving input indicative of a specified service to be produced by the designated system; and
 identifying a risk corresponding to the specified service.

26. A method according to claim 24, wherein evaluating the designated system based on the set of weights includes:
 evaluating the designated system based further on a set of ratings, frequencies, and probabilities corresponding to said at least one of the designated service and the designated risk.

27. A method according to claim 26, further comprising:
  collecting performance data relating to operating the designated system; and
  updating the set of evaluation parameters based on the collected performance data.

28. A computer-readable medium bearing instructions for evaluating the designated system, said instructions being arranged, upon execution, to cause one or more processors to perform the steps of the method according to claim 24.

29. A tool for evaluating the designated system, comprising a computer system configured to perform the method according to claim 24.

30. A method for evaluating trustworthiness of information produced by a system, comprising:
  generating a trust signature for the system, wherein the trust signature indicates trustworthiness of the system;
  associating the trust signature to the information; and
  comparing the trust signature associated to the information with a trust specification specified by a user.

31. A computer-readable medium bearing instructions for evaluating the designated system, said instructions being arranged, upon execution, to cause one or more processors to perform the steps of the method according to claim 30.

32. A tool for evaluating the designated system, comprising a computer system configured to perform the method according to claim 30.

33. A method for classifying elements of a designated system to facilitate automated evaluation of trustworthiness of the designated system:
  hierarchically decomposing a code applicable to the system into a listing that pertains to a related service and a related risk;
  assigning a referential digital sequence number to the listings of the decomposed code; and
  assigning referential digital sequence numbers to the related service and the related risk;
  whereby the referential digital sequence numbers can be employed to identify services and risks related to the code.

34. A computer-readable medium bearing instructions for evaluating the designated system, said instructions being arranged, upon execution, to cause one or more processors to perform the steps of the method according to claim 33.

35. A tool for evaluating the designated system, comprising a computer system configured to perform the method according to claim 33.

* * * * *